(12) United States Patent
Lee

(10) Patent No.: US 6,233,518 B1
(45) Date of Patent: May 15, 2001

(54) METHOD AND SYSTEM FOR PROVIDING AN IMAGE VECTOR-BASED TRAFFIC INFORMATION

(76) Inventor: Heung-Soo Lee, 801-17 Shiheung 4-dong, Keumcheon-ku, Seoul 153-034 (KR)

(*) Notice: Subject to any disclaimer, the term of this patent is extended or adjusted under 35 U.S.C. 154(b) by 0 days.

(21) Appl. No.: 09/509,349

(22) PCT Filed: Jul. 28, 1999

(86) PCT No.: PCT/KR99/00410

§ 371 Date: Mar. 27, 2000

§ 102(e) Date: Mar. 27, 2000

(87) PCT Pub. No.: WO00/07163

PCT Pub. Date: Feb. 10, 2000

(30) Foreign Application Priority Data

Jul. 28, 1998 (KR) .................................. 98-30443

(51) Int. Cl.[7] .................................. G06F 19/00
(52) U.S. Cl. .................. 701/117; 701/28; 701/118; 701/207; 701/214; 340/990; 340/995
(58) Field of Search ................. 701/25, 28, 117, 701/118, 119, 120, 207, 208, 211, 214; 340/901, 906, 907, 990, 995

(56) References Cited

U.S. PATENT DOCUMENTS 5,913,918 * 6/1999 Nakano et al. .................. 701/208
6,085,135 * 7/2000 Steckel .................................. 701/50

FOREIGN PATENT DOCUMENTS 0 749 103 A1  12/1996  (EP) .
95/24029  9/1995  (WO) .

* cited by examiner

Primary Examiner—William A. Cuchlinski, Jr.
Assistant Examiner—Gertrude Arthur
(74) Attorney, Agent, or Firm—Finnegan, Henderson, Farabow, Garrett & Dunner, L.L.P.

(57) ABSTRACT

A system and method for providing an image-based traffic information are disclosed. A plurality of time-variant real entities are converted into time-variant image vector entities and the attribute-designating statement of the time-variant image vector entity is determined based on a traffic information. Also, a plurality of time-invariant real entities are converted into a plurality of time-invariant image vector entities which constitutes a basic map. A traffic information map including at least said traffic state map is transmitted to a user device via a communication network. At user device, a basic image in accordance with the basic map is displayed on a screen of the user device and a traffic state image in accordance with the traffic state map is cumulatively displayed on the basic image.

46 Claims, 34 Drawing Sheets

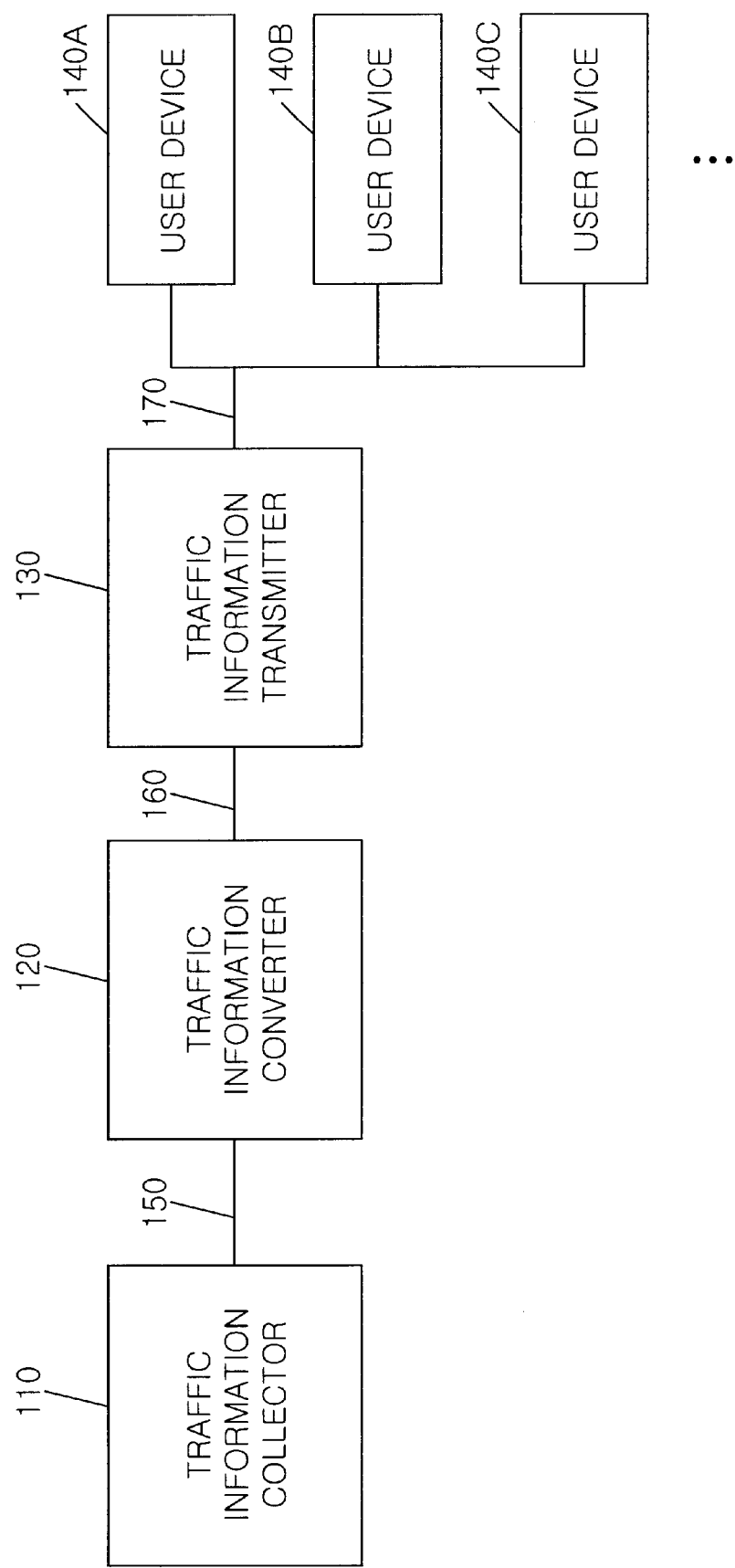

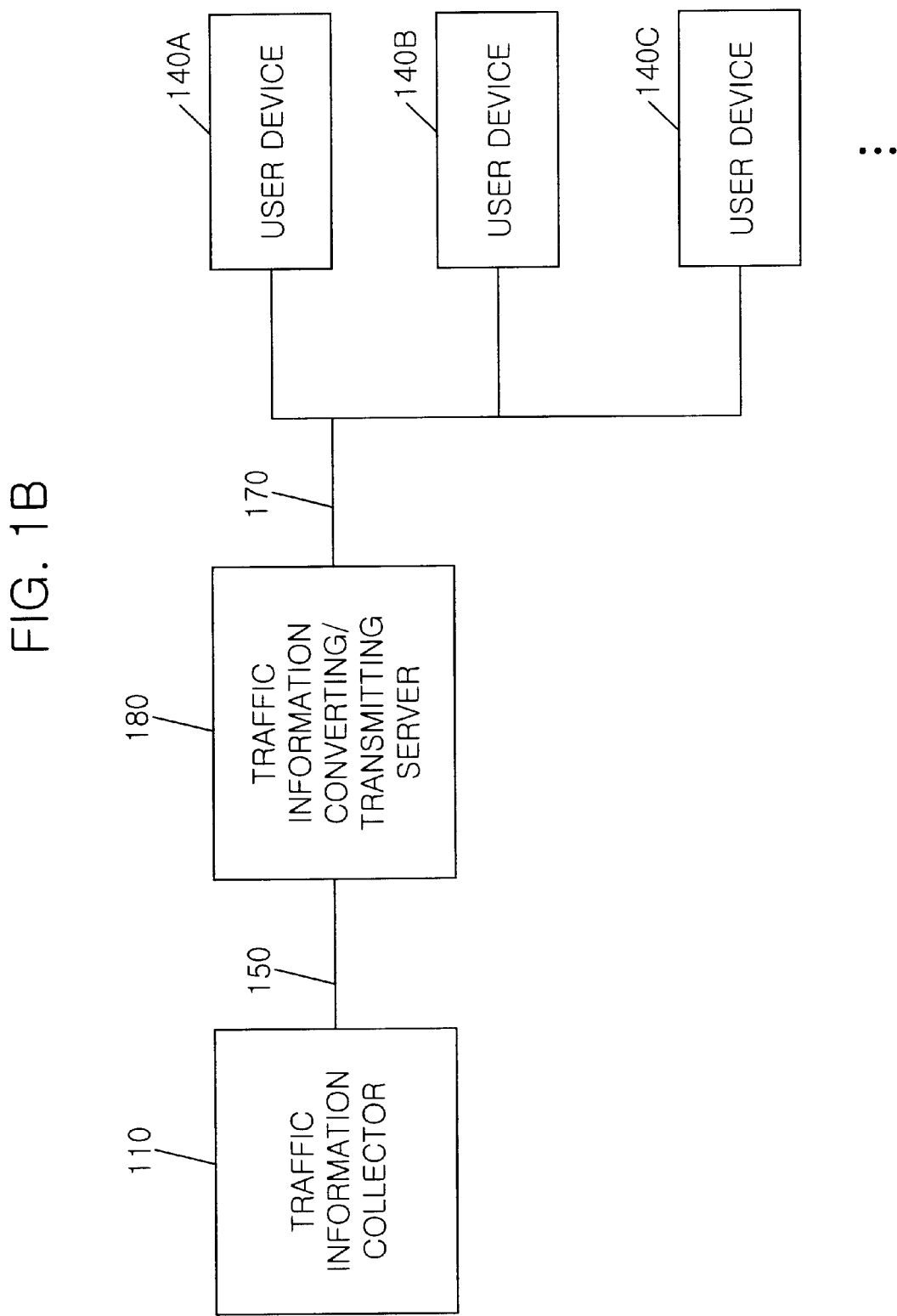

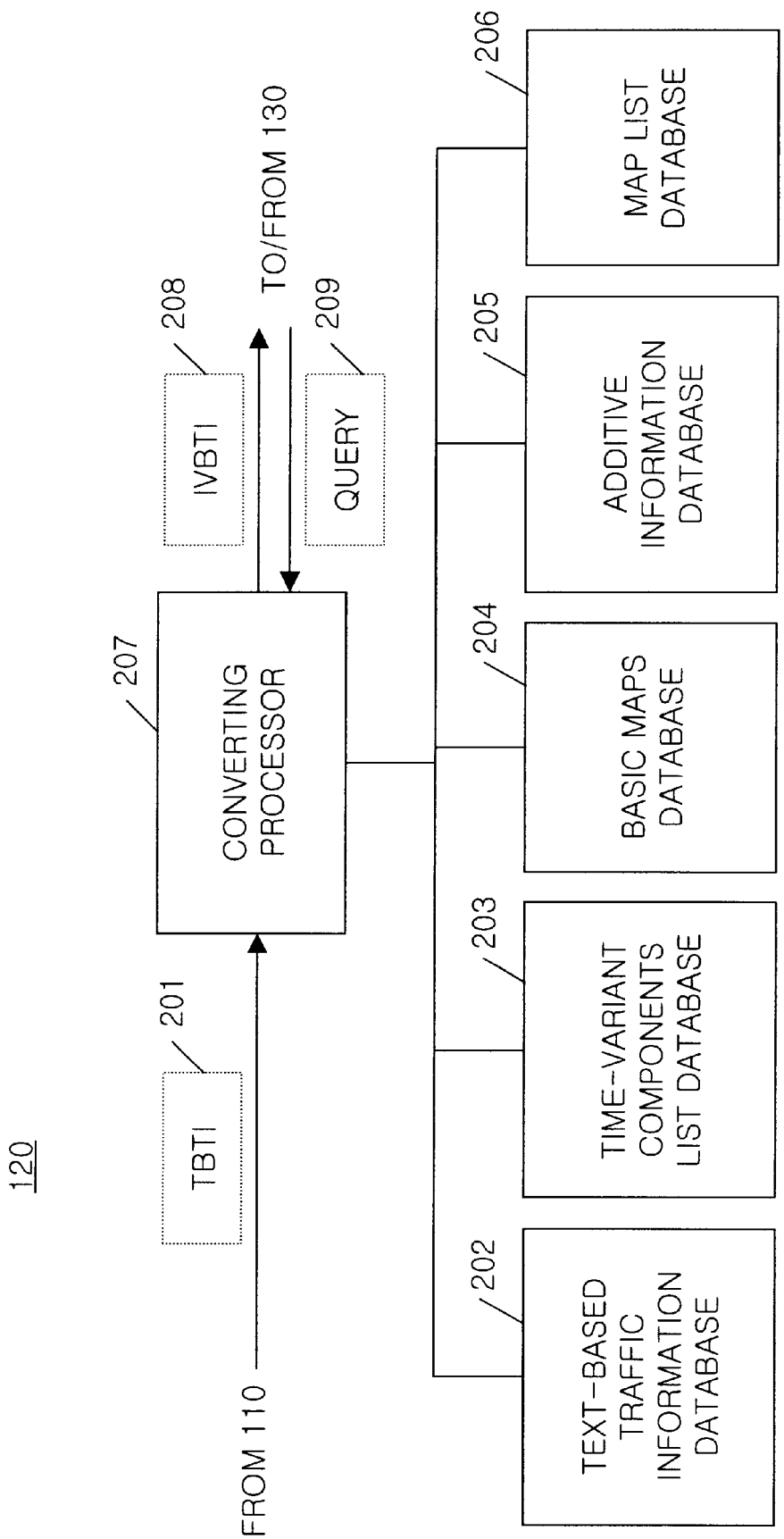

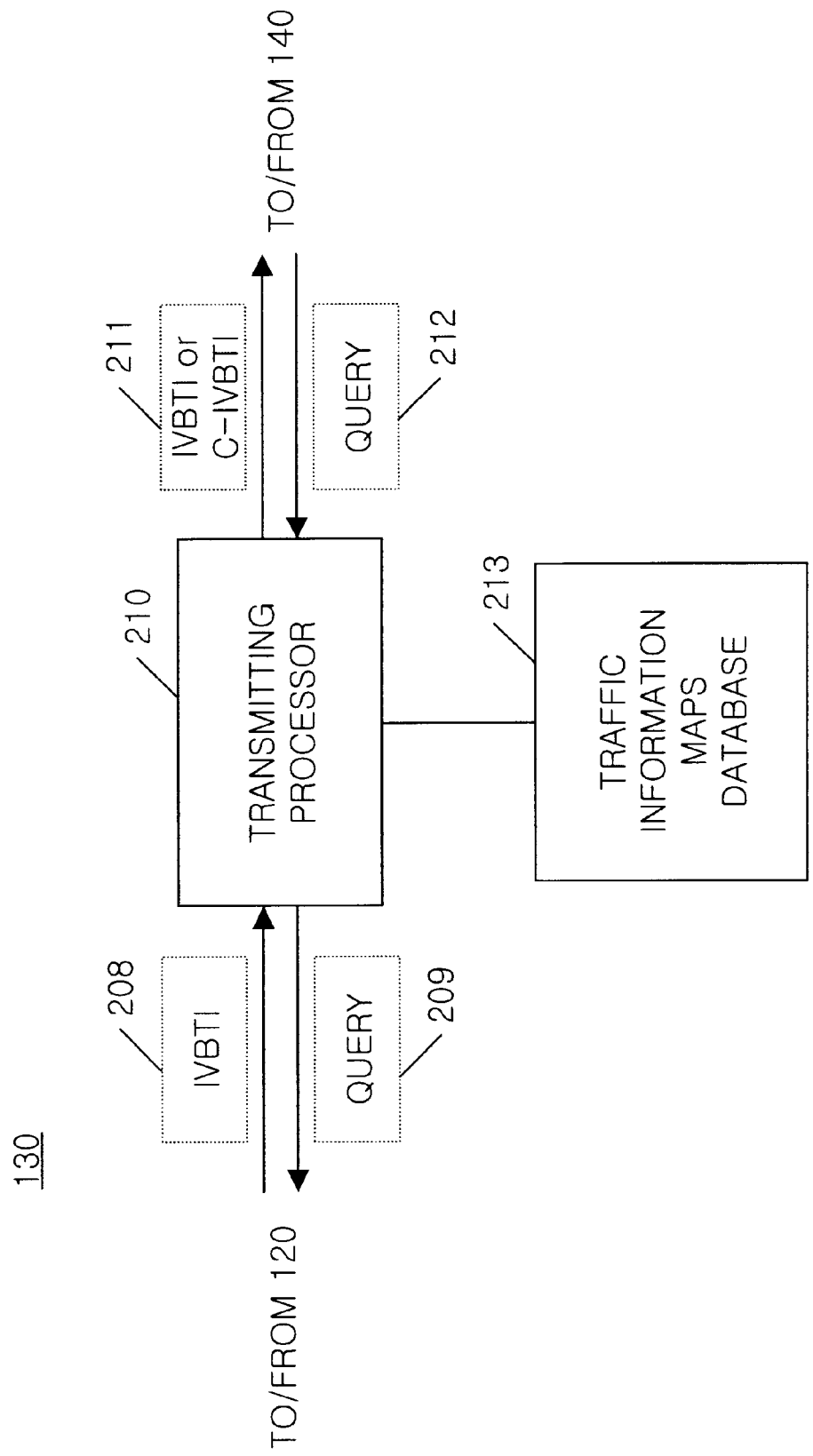

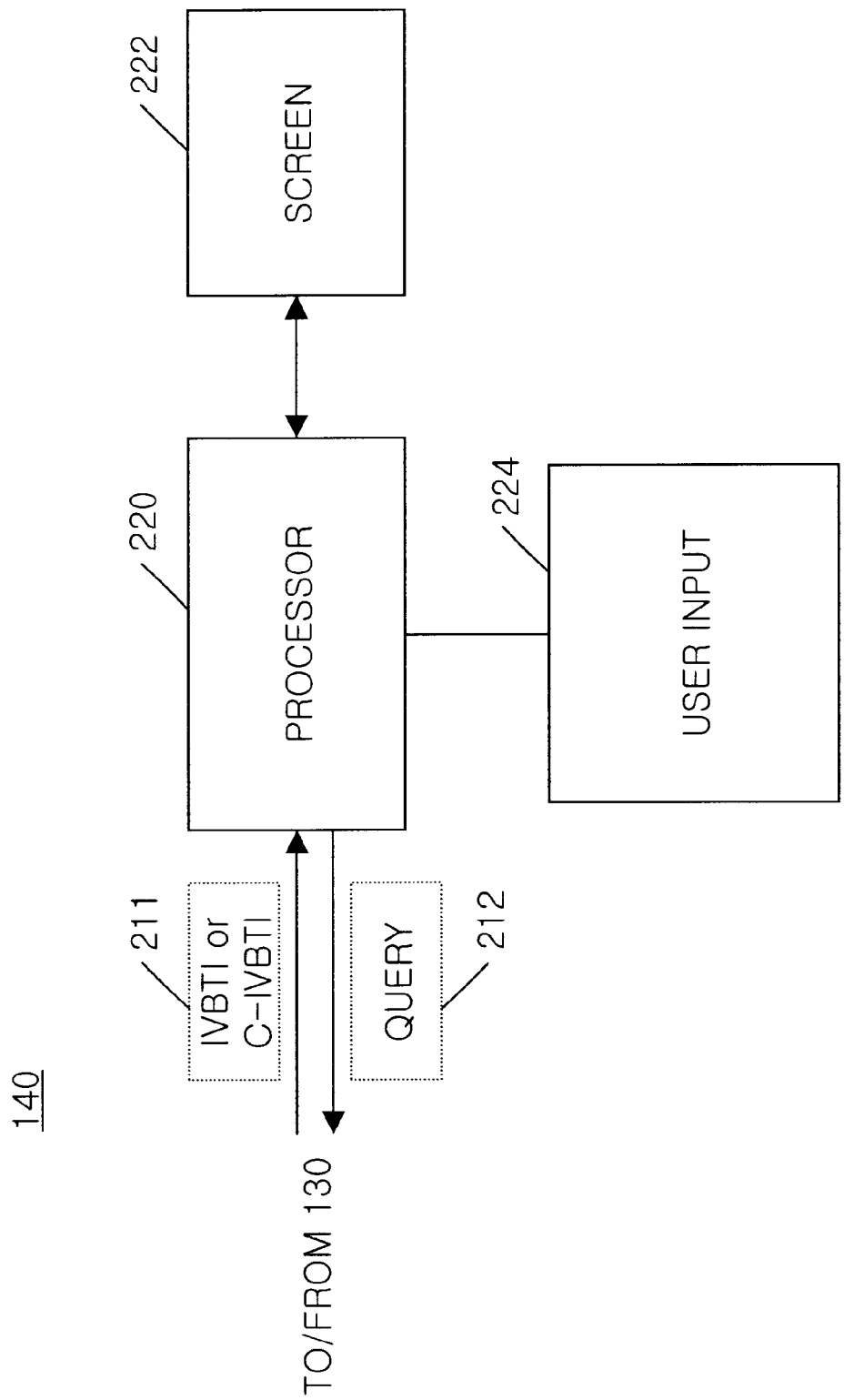

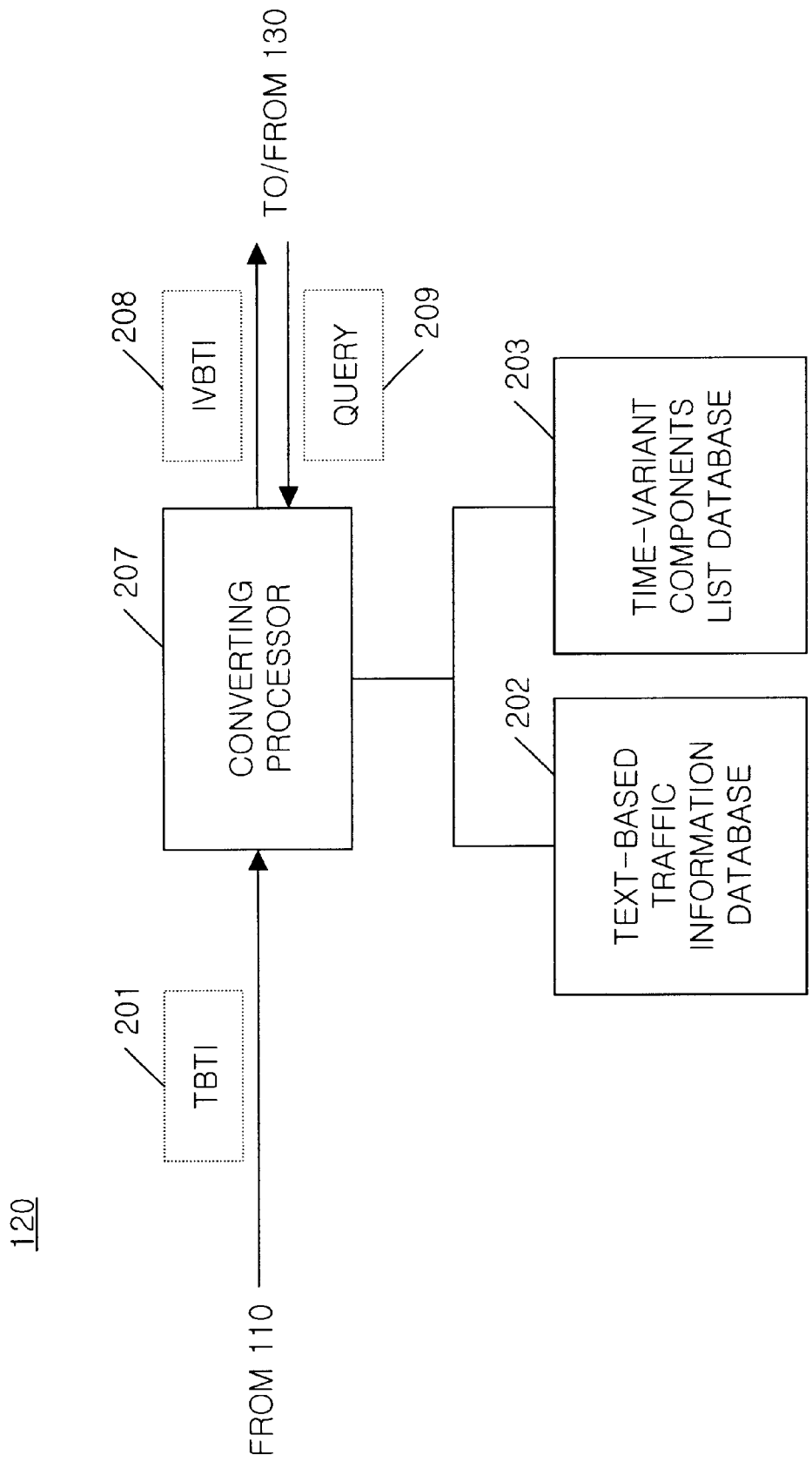

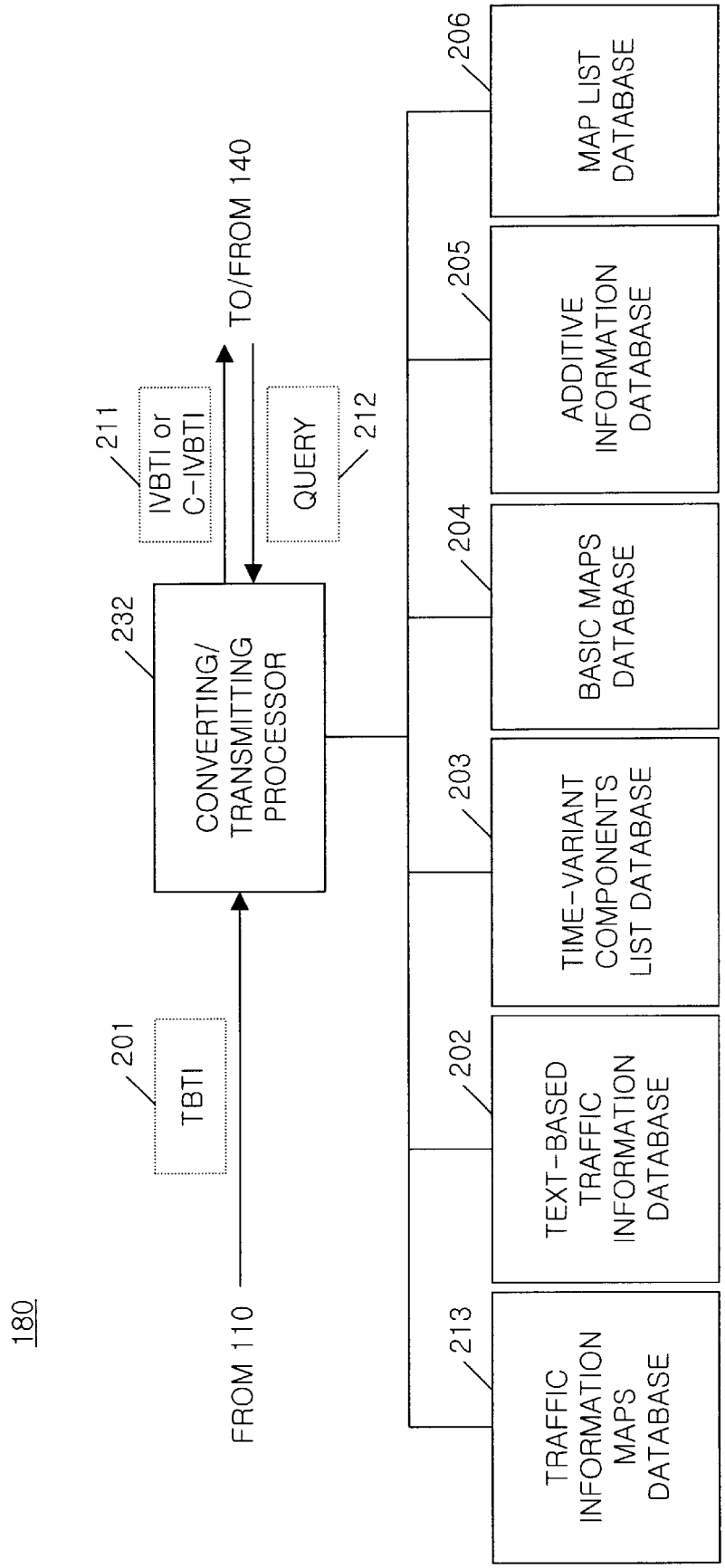

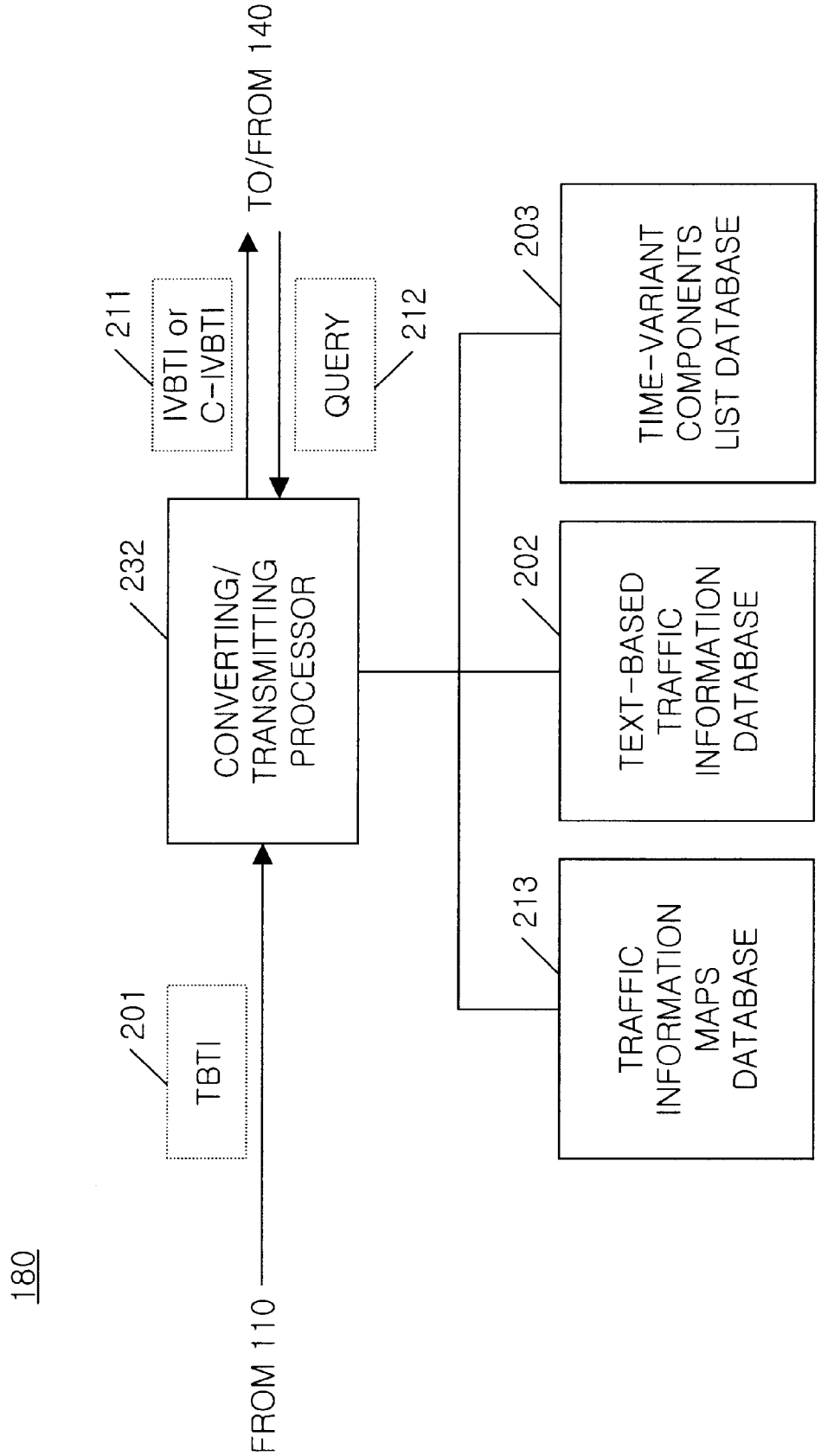

| REAL ENTITY | FORWARD VELOCITY | TRAFFIC ACCIDENT | UPDATE TIME |
|---|---|---|---|
| ROAD "XX" | 34 km/h | ○ | March 1, 1998 PM 12:00 |
| ... | ... | ... | ... |

| REAL ENTITY | IMAGE VECTOR ENTITY | FORWARD VELOCITY | TRAFFIC ACCIDENT | UPDATE TIME |
|---|---|---|---|---|
| ROAD "XX" | SHAPE(S1), POSITION(P1, P2)/... | 34 km/h | ○ | March 1, 1998 PM 12:00 |
| ... | ... | ... | ... | ... |

| REAL ENTITY | IMAGE VECTOR ENTITY | VELOCITY | | TRAFFIC ACCIDENT | | UPDATE TIME | |
|---|---|---|---|---|---|---|---|
| | | forward | backward | forward | backward | forward | backward |
| ROAD "XX" | SHAPE(S1), POSITION(P1, P2)/... | 34 km/h | 60 km/h | ○ | ○ | March 1, 1998 PM 12:00 | March 1, 1998 AM 11:30 |
| ... | ... | ... | ... | ... | ... | ... | ... |

FIG. 6C

| ENTITY ID | REAL ENTITY | IMAGE VECTOR ENTITY | FORWARD VELOCITY | TRAFFIC ACCIDENT | UPDATE TIME |
|---|---|---|---|---|---|
| 1 | ROAD "XX" | SHAPE(S1), POSITION(P1, P2)/... | 34 km/h | O | March 1, 1998 PM 12:00 |
| ... | ... | ... | ... | ... | ... |

| ENTITY ID | REAL ENTITY | IMAGE VECTOR ENTITY | VELOCITY | | TRAFFIC ACCIDENT | | UPDATE TIME | |
|---|---|---|---|---|---|---|---|---|
| | | | forward | backward | forward | backward | forward | backward |
| 1 | ROAD "XX" | SHAPE(S1), POSITION(P1, P2)/... | 34 km/h | 60 km/h | O | O | March 1, 1998 PM 12:00 | March 1, 1998 AM 11:30 |
| ... | ... | ... | ... | ... | ... | ... | ... | ... |

| MAP ID | REAL ENTITIES INCLUDED |
|---|---|
| 1 | ROAD "XX"/ ROAD "XY"/ ROAD "XY"/ ••• |
| ⋮ | ⋮ |

| MAP ID | IMAGE VECTOR ENTITIES INCLUDED |
|---|---|
| 1 | SHAPE(S1), POSITION(P1, P2)/ SHAPE(S1), POSITION(P3, P4)/ ••• |
| ⋮ | ⋮ |

| MAP ID | ENTITY IDs INCLUDED |
|---|---|
| 1 | 1/3/ ••• |
| ⋮ | ⋮ |

| MAP ID | TIME-INVARIANT IMAGE VECTOR ENTITIES INCLUDED |
|---|---|
| 1 | ATTRIBUTE(A1), SHAPE(S2), POSITION(P5, P6)/ ATTRIBUTE(A2), SHAPE(S3), POSITION(P7, P8)/ ... |
| ... | ... |

| TEXT STRING | POSITION |
|---|---|
| HAN RIVER | P9(X1,Y1) |
| SUPREME COURT | P10(X2,Y2) |
| CITY HALL | P11(X3,Y3) |
| ⋮ | ⋮ |

| MAP ID | LEFT UPPERMOST POSITION | RIGHT LOWEST POSITION |
|---|---|---|
| 1 | (X1,Y1) | (X2,Y2) |
| 2 | (X3,Y4) | (X4,Y4) |
| 3 | (X5,Y5) | (X6,Y6) |
| ⋮ | ⋮ | ⋮ |

FIG. 11A

TSM(TRAFFIC STATE MAP)

| TVIVE1/TVIVE2/TVIVE3/TVIVE4/••• |
|---|

FIG. 11B

TVIVE(TIME-VARIANT IMAGE VECTOR ENTITY)

| ATTRIBUTE(e.g. color) | SHAPE | POSITION | ••• |
|---|---|---|---|

FIG. 11C

COMPRESSED-TSM

| ATT1 | S1 | P1,P2 | ATT2 | P3,P4 | ••• |
|---|---|---|---|---|---|

FIG. 11D

ATTRIBUTE(e.g. color)

| ADC(attribute designating command) | C(color) |
|---|---|

FORWARD TVIVE

| ADC | C1 | S1 | P1,P2 |

BACKWARD TVIVE

| ADC | C2 | S1 | P2',P1' |

Compressed-TVIVE

| ADC | C1 | C2 | S1 | P1,P2 |

FIG. 12A

TIM(traffic information map)

| HEADER | BASIC MAP | TRAFFIC STATE MAP |
|---|---|---|

FIG. 12B

TIM(traffic information map)

| HEADER | TRAFFIC STATE MAP |
|---|---|

FIG. 12C

TIM(traffic information map)

| HEADER | BM | TSM | AIIVEs(Additive Information Image Vector Entities) |
|---|---|---|---|

FIG.12D

TIM(traffic information map)

| HEADER | BM | AlIVEs | TSM |
|--------|----|--------|-----|

FIG.12E

TIM(traffic information map)

| HEADER | TSM | AlIVEs |
|--------|-----|--------|

FIG.12F

TIM(traffic information map)

| HEADER | AlIVEs | TSM |
|--------|--------|-----|

FIG. 14A
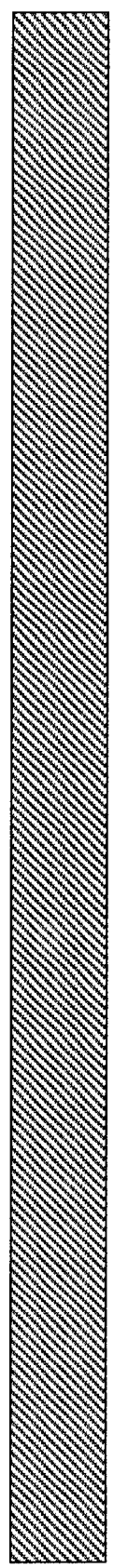 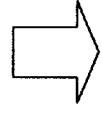 
TIM (traffic information map)
MDS: Map Description Statement
FIG. 14B
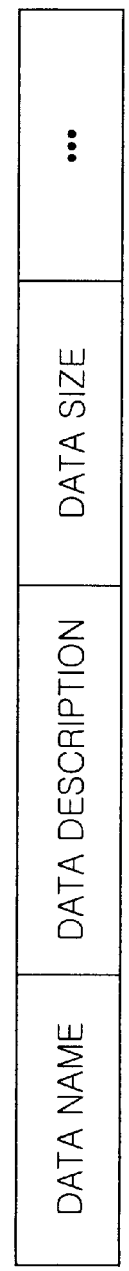
MDS

| MAP ID | TIME-INVARIANT IMAGE VECTOR ENTITIES INCLUDED | LAYER LEVEL |
|---|---|---|
| 1 | ATTRIBUTE(A1), SHAPE(S2), POSITION(P5, P6)/ ATTRIBUTE(A2), SHAPE(S3), POSITION(P7, P8)/ ••• | 1 |
| 1 | ATTRIBUTE(A2), SHAPE(S3), POSITION(P21, P22)/••• | 2 |
| 2 | ATTRIBUTE(A1), SHAPE(S2), POSITION(P15, P16)/••• | 1 |
| ⋮ | ⋮ | ⋮ |

| MAP ID | REAL ENTITIES INCLUDED | LAYER LEVEL |
|---|---|---|
| 1 | ROAD "XX"/ ROAD "XY"/ ROAD "XY"/ ••• | 1 |
| 1 | ROAD "Y1"/ ROAD "Y2"/ ROAD "Y3"/ ••• | 2 |
| 2 | ROAD "Z1"/ ROAD "Z2"/ ROAD "Z3"/ ••• | 1 |
| ⋮ | ⋮ | ⋮ |

TIM(Traffic Information Map)

TIM(TRAFFIC INFORMATION MAP)

STEP1806

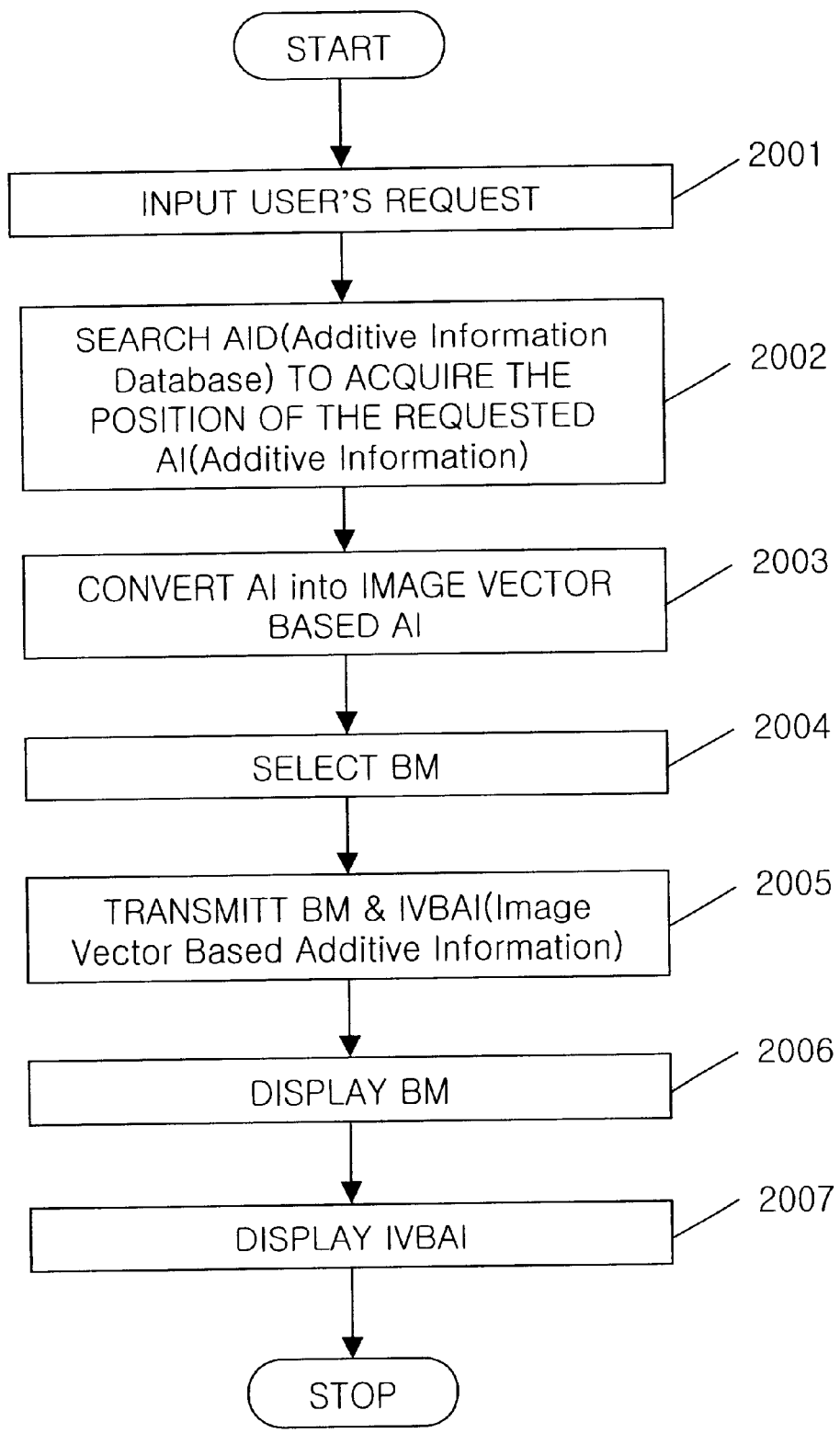

METHOD AND SYSTEM FOR PROVIDING AN IMAGE VECTOR-BASED TRAFFIC INFORMATION

TECHNICAL FIELD

The present invention relates to a traffic information providing service method and system, and in particular, to a method and a system for providing an image vector-based traffic information.

BACKGROUND ART

Presently, the environment problems and the oil wasteful consumption caused by the traffic congestion become serious in our country and further the cost for transportation is increased in geometrical. Thus, the optimization in traffic flow is earnestly required. Even though the construction of roads may be the substantial solution for traffic problem, it requires the tremendous cost. Accordingly, it is desirable to find a method for efficiently using the roads currently provided.

There is disclosed a conventional method for providing an image-based traffic information, which introduces nodes. For this method, bit-map based images are stored in the user terminal and the node database must be also stored in the user terminal. The transmitting side (or server) sends the traffic information in text along with the corresponding node numbers. Also, the receiving side (or user terminal) updates the node database in accordance with the received traffic information and node numbers and generates an image in accordance with the content of node database. However, since the node database requires a large quantity of memory and the processing for generation of the image also requires a relatively large number of operations, the user terminal is very complex and thus the cost for manufacturing becomes high, resulting in preventing the method from being popularized. Also, it is difficult that the bitmap-based images of the user terminal are replaced with another one as necessary since the size of the images are too big to be transmitted. Further, adding and/or deleting of a node may need to change the composition of the node database and thus it is not convenient for both a user and an information provider. In summary, the conventional method is prodigal.

In addition, the conventional method has the problem that, when the number of the nodes is large, it is difficult to assign node numbers to respective roads and to maintain the standard therefor.

Also, other conventional methods for transmitting the traffic information in text or in voice type are disclosed. The former method has the problem that a large quantity of data transmission should be made. The latter method has the problem that a relatively long time is required for user to acquire an interested traffic information and this type of traffic information is not easy to understand overall traffic situation.

DISCLOSURE OF INVENTION

Accordingly, the object of the present invention is to provide a method and a system for providing an image-based traffic information, capable of reducing the bandwidth for transmission and displaying the traffic information in a good quality of image.

Another object of the present invention is to provide a method and a system for providing an image-based traffic information, which can be easily managed. Also, the method and the system of this invention do not need the node management and thus has relatively simple composition. This method and system can be implemented in both simplex transmission network and duplex transmission network.

Still another object of the present invention is to provide a user device for displaying an image-based information that can be also searched.

The present invention also provides a program storage device to perform such methods.

In accordance with one aspect of the present invention, there is provided with a method of providing an image-based traffic information in a region having at least one time-variant real entity, comprising the steps of: converting the time-variant real entity into a time-variant image vector entity; generating an attribute-designating statement of the time-variant image vector entity based on a traffic information so as to form a traffic state map; transmitting the traffic state map to a user device via a communication network; and displaying an image in accordance with the traffic state map on a screen of the user device. The attribute-designating statement of the time-variant image vector may be a color designating statement. The time-variant real entity is a road and the color designating statement is determined in accordance with a velocity on the road, in one preferred embodiment.

The time-variant image vector entity of the traffic state map may include the attribute-designating statement, a shape-designating statement and a position-designating statement. The attribute-designating statement is composed of an attribute-designating command and an attribute value.

According to preferred embodiments, the method further comprises the step of compressing the traffic state map such that two time-variant image vector entities for one road are converted into one complex time-variant image vector entity composed of one attribute-designating, two attribute values, a shape-designating statement and a position-designating statement, wherein one of the two time-variant image vector entities is for forward direction and the other is for backward direction of the road.

In accordance with another embodiment of the present invention, there is provided a method of providing an image-based traffic information in a region having at least one time-variant real entity, comprising the steps of: converting the time-variant real entity into a time-variant image vector entity; generating an attribute-designating statement of the time-variant image vector entity based on a traffic information so as to form a traffic state map; converting a plurality of time-invariant real entities into a plurality of time-invariant image vector entities, wherein the plurality of time-invariant real entities are also included in the region; forming at least one basic map using the plurality of time-invariant image vector entities; forming a traffic information map which includes at least the traffic state map; transmitting the traffic information map to a user device via a communication network; displaying a first image in accordance with the basic map on a screen of the user device; and displaying a second image in accordance with the traffic state map, the second image being cumulatively displayed on the first image.

The method may further comprise the step of compressing the traffic state map such that two time-variant image vector entities for one road are converted into one complex time-variant image vector entity composed of one attribute-designating, two attribute values, a shape-designating statement and a position-designating statement, wherein one of the two time-variant image vector entities is for forward direction and the other is for backward direction of the road.

In one preferred embodiment, the traffic information map further includes the basic map. The time-variant image vector entity of the basic map may include the attribute-designating statement, a shape-designating statement and a position-designating statement. Also, the attribute-designating statement is composed of an attribute-designating command and an attribute value. In this case, the attribute-designating command is functioned as a delimiter for discerning between the time-invariant image vector entities.

According to another embodiment of the present invention, the basic map is stored in the user device.

The method may further comprise the steps of: retrieving at least one text information related to the region; converting the text information into a text-shape image vector entity; and displaying a third image in accordance with the text-shape image vector entity on the screen of the user device, the third image being also displayed cumulatively on both the first image and the second image. Also, the traffic information map may further include the text-shape image vector entity.

The steps of retrieving at least one text information related to the region and converting the text information into a text-shape image vector entity, are performed at either providing server side or the user device side.

The basic map may further include a field of 'layer level' representing the necessity to be displayed. In this case, the method further comprising the steps of: determining a user's layer level; and comparing the field of 'layer level' of the basic map with the user's layer level so as to determine whether the basic map is required to be displayed. Also, the step of displaying a first image is performed in accordance with only the basic map required to be displayed.

The method according may further comprise the steps of: dividing the traffic information map into a plurality of packets having a predetermined size; forming a plurality of blocks each of which is composed of a predetermined number of packets; and adding block identifications to the plurality of blocks, respectively. Here, the step of transmitting the traffic information map is performed by transmitting the plurality of blocks.

In accordance with still another aspect of the present invention, there is provided a method of providing an image-based information of a region, comprising the steps of: converting a plurality of time-invariant real entities into a plurality of time-invariant image vector entities, wherein the plurality of time-invariant real entities are included in the region; retrieving at least one text information related to the region; converting the text information into a text-shape image vector entity; displaying a first image in accordance with the plurality of time-invariant image vector entities on a screen of the user device; and displaying a second image in accordance with the text-shape image vector entity on the screen of the user device, the second image being displayed cumulatively on the first image.

The present invention also provides a system of providing an image-based traffic information in a region, comprising: a time-variant components list database including a plurality of time-variant component lists each of which has at least one time-variant real entity in a specified region; a conversion table representing correspondences of time-variant real entities and an time-variant image vector entities; means for generating a traffic state map by converting the time-variant real entity included in a specified region into the time-variant image vector entity using the conversion table and by generating an attribute-designating statement of the time-variant image vector entity based on a traffic information; and means for transmitting the traffic state map to a user device via a communication network.

The system may further comprise a basic maps database for storing a plurality of basic maps each of which is composed of a plurality of time-invariant image vector entities, wherein each of time-invariant real entities included in the region is represented by at least one time-invariant image vector entity.

In addition, the system may further comprise an additive information database for storing a plurality of text information and corresponding position data. The system may include means for converting the text information and corresponding position data into a text-shape image vector entity. Also, the system may further include a map list database for storing a plurality of map identification and corresponding covered range data.

Also, the system may further comprises means for producing a traffic information map using at least the traffic state map; a traffic information maps database for storing the traffic information map; and means for transmitting the traffic information map on a user's request.

According to still yet another aspect of the present invention, there is provided a user device for displaying an image-based traffic information, comprising: a screen; means for receiving a traffic information map from a traffic information providing server via a network, wherein the traffic information map includes at least a traffic state map composed of at least one time-variant image vector entity and an attribute-designating statement of the time-variant image vector entity is determined in accordance with a traffic information related to corresponding real entity; and means for displaying a first image in accordance with a basic map which is composed of a plurality of time-invariant image vector entities included in a specified region and for displaying a second image in accordance with the traffic state map on the screen, the second image being cumulatively displayed on the first image.

In preferred embodiment, the user device further comprises an input means for inputting a user's command including a region selection command.

Alternatively, the user device further comprises a basic maps database for storing a plurality of basic maps, an additive information database for storing a plurality of text information and corresponding position data, means for converting the text information and corresponding position data into a text-shape image vector entity, and a map list database for storing a plurality of map identification and corresponding covered range data.

The present invention also provides a user device for displaying an image-based information, comprising: a screen; an input means for inputting a user's command including a position name to be wanted to know; an additive information database for storing a plurality of additive information each of which is composed of a text string and a position data; means for retrieving one additive information based on the user's command; a basic maps database for storing a plurality of basic maps each of which is composed of a plurality of time-invariant image vector entities, wherein each of time-invariant real entities included in a region is represented by at least one time-invariant image vector entity; means for selecting at least one basic map in accordance with the retrieved additive information; means for displaying a first image based on the selected basic map; and means for displaying a second image based on the selected additive information. This user device further comprises means for converting the selected additive information into a text-shape image vector entity.

According to still yet another aspect of the invention, there is provided a method for displaying an image-based traffic information comprising the steps of: receiving a traffic information map which includes at least a traffic state map, the traffic state map includes a plurality of time-variant image vector entities in a specified region and each of the time-variant image vector entity includes an attribute-designating statement, an(a) shape-designating statement and a position-designating statement; displaying a first image in accordance with a basic map on a screen, the basic map includes a plurality of time-invariant image vector entities in the specified region; and displaying a second image in accordance with the traffic state map such that the second image is cumulatively displayed on the first image.

In addition, the present invention provides program storage devices readable by a digital processing apparatus and tangibly embodying a program of instructions executable by the digital processing apparatus to perform above described methods.

BRIEF DESCRIPTION OF DRAWINGS

For a more complete understanding of the present invention and the advantage thereof, reference is now made to the following description taken in conjunction with the accompanying drawings in which:

FIGS. 1A–1C are block diagrams of the traffic information providing system in accordance with the preferred embodiments of the present invention;

FIGS. 2A, 2B and 2C are detailed block diagrams of the traffic information converter 120, the traffic information transmitter 130 and the user device 140, respectively, shown in FIGS. 1A and 1C in accordance with one preferred embodiment of the present invention;

FIGS. 3A and 3B are detailed block diagrams of the traffic information converter 120 and the user device 140, in accordance with another preferred embodiment of the present invention;

FIGS. 4A and 4B are detailed block diagrams of the traffic information converting/transmitting server 180 shown in FIG. 1B, in accordance with preferred embodiments of the present invention;

FIG. 5 shows an example of the text-based traffic information TBTI 201;

FIGS. 6A–6D illustrate the preferred embodiments of the text-based traffic information database 202 shown in FIG. 2A and FIG. 3A;

FIGS. 7A–7C are the construction of the time-variant components list database 203, in accordance with preferred embodiments of the present invention;

FIG. 8 shows an example of the basic maps database 204;

FIG. 9 illustrates the construction of the additive information database 205 in accordance with one preferred embodiment of the present invention;

FIG. 10 is a diagram of illustrating the map list database 206 in accordance with one preferred embodiment of the present invention;

FIGS. 11A–11E are the diagrams for illustrating the exemplary format of TSM(Traffic State Map) in accordance with one preferred embodiment of the present invention;

FIGS. 12A–12F are the diagrams for illustrating the format of TIM(Traffic Information Map) in accordance with the preferred embodiments of the present invention;

FIGS. 14A and 14B show data formats for IVBTI(Image Vector-Based Traffic Information) to be transmitted through the communication network from the traffic information transmitter 130 (or the traffic information converting/transmitting server) to the user device 140;

FIG. 16A illustrates the format of the basic maps database 204 including the field of 'layer level';

FIG. 16B illustrates the configuration of the time-variant components list database 203 including the field of 'layer level', in another preferred embodiment of the present invention;

FIG. 20 is a flowchart for illustrating a method for providing a image-based additive information, in accordance with one preferred embodiment of the present invention.

BEST MODE FOR CARRYING OUT THE INVENTION

Figure 1C:
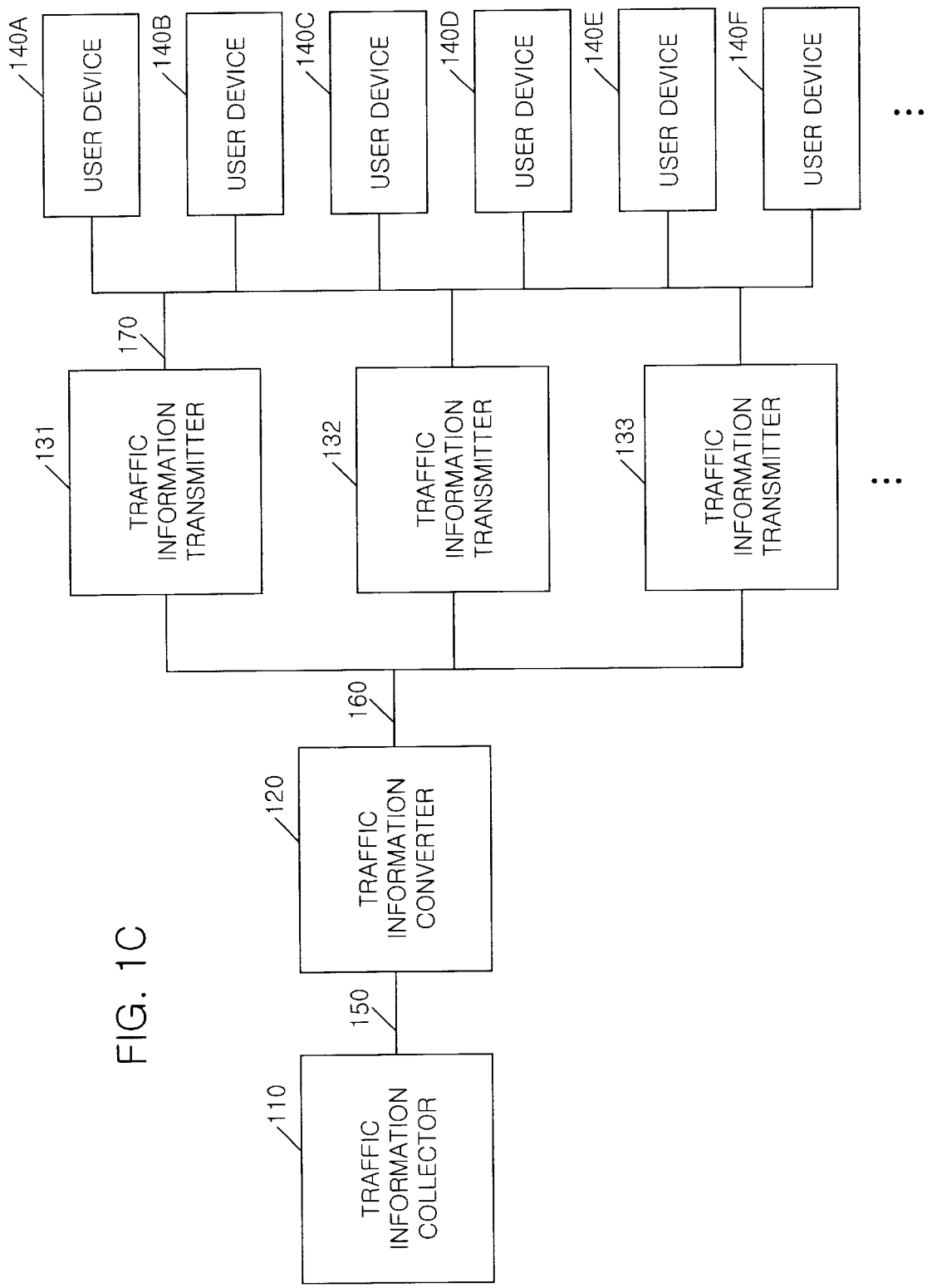

The preferred embodiment of the present invention will hereinafter be described in detail with reference to the accompanying drawings. The same elements in the drawings have the same reference numerals and thus the cumulative explanation will be omitted for simplicity.

FIGS. 1A–1C are block diagrams of an traffic information providing system in accordance with the preferred embodiment of the present invention.

Referring to FIG. 1A, the traffic information providing system includes a traffic information collector 110, a traffic information converter 120, a traffic information transmitter 130 and at least one user device 140A, 140B and 140C (hereinafter reference numeral '140' is used as representative 140A, 140B, 140C . . . ).

The traffic information collector 110 collects traffic informations from various sources, for example, a sensor disposed on a road, a CCTV disposed above the road, a monitoring staff who is running on a road and so on. The traffic information collector 110 produces a text-based traffic information TBTI to the traffic information converter 120. Here, the traffic information collector 110 may be directly coupled to the traffic information converter 120. Otherwise, the traffic information collector 110 may be indirectly coupled to the traffic information converter 120 via any kind of communication line, for example, a mobile communication network, an Internet, a public switching network and so on.

The traffic information converter 120 converts the text-based traffic information TBTI into a image vector-based traffic information, more specifically, into a traffic state map TSM or a traffic information map TIM. The traffic information map TIM may be composed of a traffic state map TSM and at least one basic map.

The basic map is composed of time-invariant image vector entities, each of which corresponds to a part or the entire of a real entity (e.g. a mountain, a river, a building and so on).

Also, there are two kinds of basic map: primary basic map and additive basic map, in accordance with one preferred embodiment of the present invention.

Each of the primary basic maps is composed of time-invariant image vector entities that are mandatory when an image-based traffic information for a requested region is displayed on a screen of a user's device. The mandatory time-invariant image vector entity represents, for example, a mountain, a landmark building, a public organization, a river, a bridge and so on.

Each of additive basic maps is composed of optional time-invariant image vector entities.

In more detail, the time-invariant real entities such as a mountain, a river, a building, a hospital, a post office, an office and so on may be classified according to the necessity (i.e. a layer level) to be displayed on a screen of the user's device and/or the attribute thereof.

That is, the real entities to be mandatory for displaying can be classified such that the corresponding image vector entities pertain to a primary basic map. Likewise, the optional time-invariant real entities can be classified such that their corresponding image vector entities pertain to one of additive basic maps.

Also, the real entities necessary for a specific display (e.g. as is the case that a user wishes to know the positions of hospitals or clinics) can be classified so as to correspond to one of the additive basic maps.

The basic map as described above may be stored in the traffic information converter 120. More preferably, the basic maps are stored in the user device 140.

According to one preferred embodiment of the present invention, the time-invariant image vector entity for basic map can be represented by VideoTex format.

The traffic state map is composed of traffic state image vector entities, each of which is time-variant. The traffic state image vector entity is for example an image vector entity for representing a road, the color of which varies according to the velocity on the road.

Also, the time-variant image vector entity included in the traffic state map can be represented by VideoTex format.

The traffic information transmitter 130 receives the traffic state map or the traffic information map from the traffic information converter 120 and provides it to the user device 140 with or without user request. The traffic information transmitter 130 has a communication function from/to the user device and preferably has a storage for maintaining the traffic information map or the traffic state map. Also, the link between the traffic information transmitter 130 and the user device 140 may be for example, a paging communication network, a packet communication network, a mobile communication network, a broadcasting network, or an Internet. In addition, the traffic information transmitter 130 may be coupled to a conventional base station of mobile communication network, a BBS(Bulletin Board Services) server of packet communication network and so on.

The user device 140 includes a screen for displaying an image based traffic information and a communication function for receiving the traffic state map or the traffic information map from the traffic information transmitter. Thus, the user device 140 displays the image based traffic information based on the traffic information map or the traffic state map. For this, the user device 140 may have the function for converting from the image vector-based traffic information into a bitmap image-based traffic information. Also, when the user device 140 receives only the traffic state map from the traffic information transmitter 130, the user device 140 stores at least one basic map and thus further includes a storage for storing the basic map.

It can be appreciated that a number of user devices can be coupled to the traffic information transmitter 130 via a communication network.

Referring to FIG. 1B, the traffic information providing system includes a traffic information converting/transmitting server 180 which incorporates the traffic information converter and the traffic information transmitter.

Further, referring to FIG. 1C, the traffic information providing system includes a plurality of traffic information transmitters 131, 132 and 133, each of which in turn provides the traffic information map or the traffic state map to user devices 140A, 140B, 140C, 140D, 140E and 140F.

FIGS. 2A, 2B and 2C are detailed block diagrams of the traffic information converter 120, the traffic information transmitter 130 and the user device 140, respectively, shown in FIGS. 1A and 1C in accordance with one preferred embodiment of the present invention.

Referring to FIG. 2A, the traffic information converter 120 includes a converting processor 207, a text-based traffic information database 202, a time-variant components list database 203, a basic maps database 204, an additive information database 205 and a map list database 206.

The converting processor 207 is coupled to the text-based traffic information database 202, the time-variant components list database 203, the basic maps database 204, the additive information database 205 and the map list database 206.

The converting processor 207 receives the text-based traffic information TBTI 201 from the traffic information collector 110 and produces an image vector based traffic information IVBTI 208 (i.e. TIM) to the traffic information transmitter 130. The converting processor 207 may receive a query 209 from the traffic information transmitter 130, which originates from the user device 140. The query 209 represents which region the user wishes to know the traffic information of.

The converting processor 207 updates the text-based traffic information database 202 using the text-based traffic information TBTI 201.

While the text-based traffic information database 202 is depicted as being located within the traffic information converter 120 in this embodiment, it may be located in the traffic information collector 110 in another embodiment. In this case, the query 209 may be transferred up to the traffic information collector 110 so that the traffic information collector 110 should produce only the text-based traffic information requested by the user.

Here, referring to FIGS. 5–9, the text-based traffic information TBTI 201, the text-based traffic information database 202, time-variant components list database 203, basic maps database 204, the additive information database 205 and the map list database 206 will be explained.

FIG. 5 shows an example of the text-based traffic information TBTI 201, which is composed of the fields of 'real entity', 'forward velocity', 'traffic accident', 'update time' and so on. The 'real entity' field represents the name of real entity, for example, ROAD "XX" and the 'forward velocity' field represents the velocity on the road. The 'traffic accident' field represents whether any traffic accident occurs on the road or not and the 'update time' field represents the time when the latest updating is performed.

FIGS. 6A–6D illustrate the preferred embodiments of the text-based traffic information database 202 shown in FIG. 2A and FIG. 3A.

In FIG. 6A, the text-based traffic information database 202 is composed of 'real entity', 'image vector entity', 'forward velocity', 'traffic accident' and 'update time'.

The 'image vector entity' field includes at least one image vector entity corresponding to the real entity. For example, the road "XX" can be represented by a line vector which starts at position 'P1' and ends at position 'P2'. Alternatively, one real entity can be represented by two or more image vectors. For example, the road "XX" can be represented by two line vectors connected to each other. Like this, the real entity can be represented by at least one image vector. The image vector may be a line, an arc, a point, a curve, a text string, and so on. The 'shape' statement in the 'image vector entity' field represents the kind of the image vector(e.g. a line) and the 'position' statement represents the position of the image vector. The position statement in the image vector entity of the text-based traffic information database 202 is preferably represented by absolute coordinate (e.g. the coordinate in GPS system).

In FIG. 6B, each field of 'velocity', 'traffic accident' and 'update time' are divided into two fields: 'forward' and 'backward'. This structure is designed upon that there are two directions on a road in general.

Referring to FIGS. 6C and 6D, the text-based traffic information database 202 further includes the field of 'entity ID(Entity Identification), compared with FIGS. 6A and 6B, respectively.

As known in FIGS. 6A–6D, it will be appreciated that the text-based traffic information database 202 has two functions: conversion table function(real entity →image vector entity) and traffic information management function.

The time-variant components list database 203 can be constructed as shown in FIGS. 7A–7C.

In FIG. 7A, the time-variant components list database 203 includes the fields of 'map ID' and 'real entities included'. The 'real entities included' field represents the time-variant real entities included in the area specified by corresponding 'map ID'.

In FIG. 7B, the time-variant components list database 203 includes the fields of 'map ID' and 'image vector entities included'. The 'image vector entities included' field represents the time-variant image vector entities included in the area specified by corresponding 'map ID'.

In FIG. 7C, the time-variant components list database 203 may include the fields of 'map ID' and 'entity IDs included'. The 'entity IDs included' field represents the entity IDs (identifications) that corresponds to the real entities included in the area specified by corresponding 'map ID'. For this, it is necessary that the text-based traffic information database 202 should include the field of 'entity ID' as shown in FIGS. 6C and 6D.

FIG. 8 shows an example of the basic maps database 204 which includes the fields of 'map ID' and 'time-invariant image vector entities included'. In FIG. 8, the 'map ID' is substantially the same with that of time-variant components list database 203 shown in FIGS. 7A–7C. The field of 'time-invariant image vector entities included' includes at least one TIIVE(Time-Invariant Image Vector Entity) included in the covered area of the map. For example, MAP-1(i.e. the map of which 'map ID' is '1') includes TIIVE1(composed of ATTRIBUTE(A1), SHAPE(S2) and POSITION(P5, P6)) and TIIVE2(composed of ATTRIBUTE(A2), SHAPE(S3) and POSITION(P7, P8)).

FIG. 9 illustrates the construction of the additive information database 205 in accordance with one preferred embodiment of the present invention, in which the additive information database 205 includes the fields of 'text string' and 'position'. Here 'position' field is preferably represented by absolute coordinate and denotes the position at which the text string is displayed. It is noted that the image of 'Han' river is stored in the 'time-invariant image vector entities included' field of the basic maps database 204 (since a river is a time-invariant real entity) while the text string of 'HAN RIVER' is stored in the additive information database 205.

Such text string and corresponding position data of additive information database 205 are converted into text-shape image vector entity by the converting processor 207. Alternatively, this conversion can be performed by the user device 140.

In accordance with another embodiment, the text string of 'HAN RIVER' can be also stored in the basic maps database 204 as an image vector.

Though the text string of additive information database 205 is a time-invariant real entity, it is also required to be searched. Thus, the text type real entity(e.g. the text strings of 'city hall', 'Seoul university general hospital', 'central post office', 'Seung-Dong fire-brigade station' and so on) is included in the additive information database 205.

FIG. 10 is a diagram of illustrating the map list database 206 in accordance with one preferred embodiment of the present invention, in which the map list database 206 includes the fields of 'map ID', 'left uppermost position' and 'right lowest position'.

Here, the field of 'map ID' is the same with that of the time-variant components list database 203 and the basic maps database 204. The fields of 'left uppermost position' and 'right lowest position' represent the covered range of the map designated by the 'map ID' and is preferably denoted by absolute coordinates. The covered range is the rectangular area having the left uppermost point and the right lowest point designated by the fields of 'left uppermost position' and 'right lowest position'.

Figure 13:
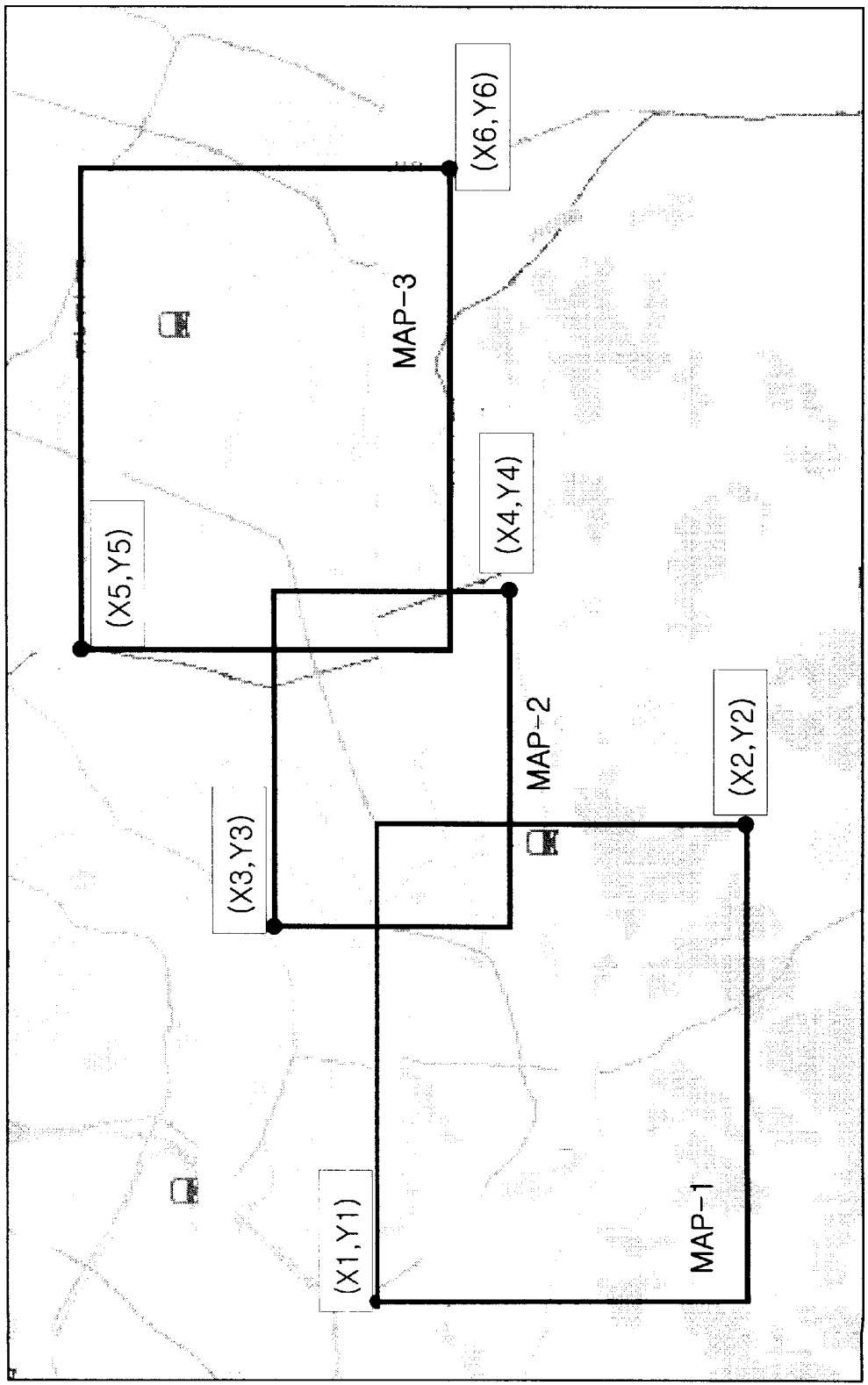
FIG. 13 shows the covered range of maps, each of which is denoted by the fields of 'left uppermost position' and 'right lowest position' shown in FIG. 10.

FIG. 13 shows the covered range of maps, each of which is denoted by the fields of 'left uppermost position' and 'right lowest position' shown in FIG. 10. In FIG. 13, the covered range of the MAP-1 is the rectangular area determined by two corner points (X1, Y1) and (X2, Y2). Likewise, the covered range of the MAP-2 is the rectangular area determined by the points (X3, Y3) and (X4, Y4) and the covered range of the MAP-3 is the rectangular area determined by two corner points (X5, Y5) and (X6, Y6).

The covered range of the map can be represented by other conventional methods.

Return to FIG. 2A, the converting processor 207 generates a traffic state map using the text-based traffic information database 202 and the time-variant components list database 203.

First, the converting processor 207 analyses the query 209 from the user and then selects one map (i.e. produces one map ID) in the map list database 206 such that the selected map should cover the region the user wants. This process can be omitted in the one-way transmission service explained later.

Then the converting processor 207 retrieves 'real entities', 'image vector entities' or 'entity IDs' included in the selected map from the time-variant components list database 203. Subsequently, the converting processor 207 converts the real entities into image vector entities using the text-based traffic information database 202 as shown in FIGS. 6A–6D. Here, the attribute of the image vector entity is preferably determined based on the 'forward velocity' field. When any traffic accident occurs on a road included in the selected map, the converting processor 207 generates a special image vector entity (which is predetermined as a traffic accident mark) disposed on the road.

Here, the position of the image vector entity is preferably represented by relative coordinates within the selected map. Thus, the generation of traffic state map preferably includes the process of coordinate conversion of the image vector entity.

FIGS. 11A–11E are the diagrams for illustrating the exemplary format of TSM(Traffic State Map) in accordance with one preferred embodiment of the present invention.

Referring to FIG. 11A, TSM includes a plurality of Time-Variant Image Vector Entities TVIVE1, TVIVE2, TVIVE3, TVIVE4 and so on. In FIG. 11B, the TVIVE (Time-Variant Image Vector Entity) includes an attribute-designating statement, a shape-designating statement and a position-designating statement. Here, the attribute is for example a color, a brightness or a pattern.

Most of the time-variant real entities are roads which can be represented by line image vectors. Thus, most of the shape-designating statement in TVIVE are the same (i.e. 'line'). In this case, TSM can be efficiently compressed as shown in FIG. 11C. In FIG. 11C, ATT1 and ATT2 represent attribute-designating statements, S1 represents a shape-designating statement and P1,P2,P3 and P4 represent position coordinates. Here, the position-designating statement includes one or more position coordinates. For example, the shape-designating statement of 'line' may requires two position coordinates: a start position coordinate and an end position coordinate. Also, in FIG. 11C, the ATT1, S1, P1 and P2 constitute one TVIVE and ATT2, P3 and P4 constitute another TVIVE. When the compressed-TSM shown in FIG. 11C is received in the user device, the second TVIVE (including ATT2, P3 and P4) is processed using the previous shape-designating statement (i.e. 'S1').

The attribute-designating statement is preferably composed of two parts: ADC(Attribute-Designating Command) and C(attribute content, e.g. color) as shown in FIG. 11D. Here, the color is preferably determined according to the velocity on the corresponding road (i.e. the average velocity of a car running the road). The ADC is for example 'set color' command or 'select color' command. Preferably, the ADC can be used as a delimiter which discriminates between TVIVEs.

Figure 11E:
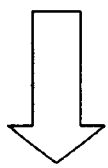

Referring to FIG. 11E, a method for compressing TVIVE will be explained. As mentioned above, there are two directions (forward and backward) in a road. While the velocity(i.e. 'color') can be different from each other, they have much similarity in shape and position. Thus, TVIVEs of the forward direction road and the backward direction road can be compressed as shown in FIG. 11E. The compressed-TVIVE includes an attribute-designating statement composed of an ADC and two Colors C1 and C2; a shape-designating statement S1; and a position-designating statement composed of two position coordinates P1 and P2.

Referring back to FIG. 2A, the converting processor 207 retrieves the requested information from the additive information database 205 that is preferably included in the selected map. Then, the converting processor 207 generates an additive information image vector using the text string and the corresponding position of the retrieved information (see FIG. 9). This conversion also includes a coordinate conversion of absolute coordinate into relative coordinate within the selected map. Here, the shape-designating statement of the additive information image vector is preferably 'text' and the size thereof may be determined by user or automatically.

As described above, the additive information database 205 supports a search function. When a user wants to know the hospitals' position in a region, the searching of 'hospital' is performed in the additive information database 205.

It is well appreciated to those in this art that for simplicity the additive information database 205 can be omitted (that is, it is optional).

FIGS. 12A–12F are the diagrams for illustrating the format of TIM(Traffic Information Map) in accordance with the preferred embodiments of the present invention.

In FIG. 12A, TIM includes a header, a basic map and a traffic state map. The header may include for example a TIM type, a resolution and so on. The TIM of FIG. 12B includes a header and a TSM. This type of TIM is suitable for the case that the basic map is stored in the user device 140. The header of TIM shown in FIG. 12B preferably includes the map ID, which is in turn used for retrieving suitable basic map stored in the user device. Alternatively, if the header does not include 'map ID', the TIM is added with the position values representing the covered range of BM and/or TSM and these position values can be represented as absolute coordinates such as GPS coordinates.

Referring to FIG. 12C, TIM further includes AIIVEs (Additive Information Image Vector Entities) compared with that of FIG. 12A. The AIIVEs are originated from the retrieved ones in the additive information database 205. In FIG. 12D, AIIVEs are located between BM(Basic Map) and TSM(Traffic State Map), while AIIVEs follow TSM in FIG. 12C.

In FIGS. 12E and 12F, TIM further includes AIIVEs, compared with that of FIG. 12B. In FIG. 12E, AIIVEs are disposed at the end of TSM, while they are located between the header and TSM in FIG. 12F. The TIMs shown in FIGS. 12E and 12F are also suitable for the case that the basic map is stored in the user device 140.

Referring to FIG. 2B, the traffic information transmitter 130 will be explained. The traffic information transmitter 130 includes a transmitting processor 210 and a traffic information maps database 213. The traffic information maps database 213 is optional. The transmitting processor 210 receives the IVBTI(i. e. TIM) from the traffic information converter 120 and sends the query 209 to the traffic information converter 120. Also, the transmitting processor 210 sends an IVBTI or a C-IVBTI(Compressed-IVBTI) to the user device 140 via a communication network such as a mobile communication network or an Internet. The compressed-IVBTI(or compressed-TIM) may be acquired by conventional data-compression of TIM.

Also, it is well known to those in this art that a conventional error correction coding or a channel coding can be performed with respect to TIM by the transmitting processor 210.

The query 212 is substantially the same with the query 209, but this can be little different from that in format as necessary. In the case that the link between the traffic information transmitter and the user device is one-way communication network, the query 212 can be omitted.

Referring to FIG. 2C, the user device 140 includes a processor 220, a screen 222 and a user input 224. The processor 220 has a communication function at least for receiving the VBTI or C-IVBTI from the traffic information transmitter through a network. Further, it is preferable that it could transmit the query 212 to the traffic information transmitter 130.

The user input 224 is for inputting user's command, especially the region designation command which represents the region the user wants to know. The processor 220 also has an data analyzing function, a data conversion function as necessary (e. g. the conversion of image-vector entity into bit-map image) and a displaying function.

The processor 220 first displays a basic map image on the screen 222 in accordance with the BM(Basic Map) and then a TSM image is cumulatively displayed(i. e. overwritten) on the BM image in accordance with the TSM. In other words, some part of the image on the screen are updated by TSM image.

Figure 3B:
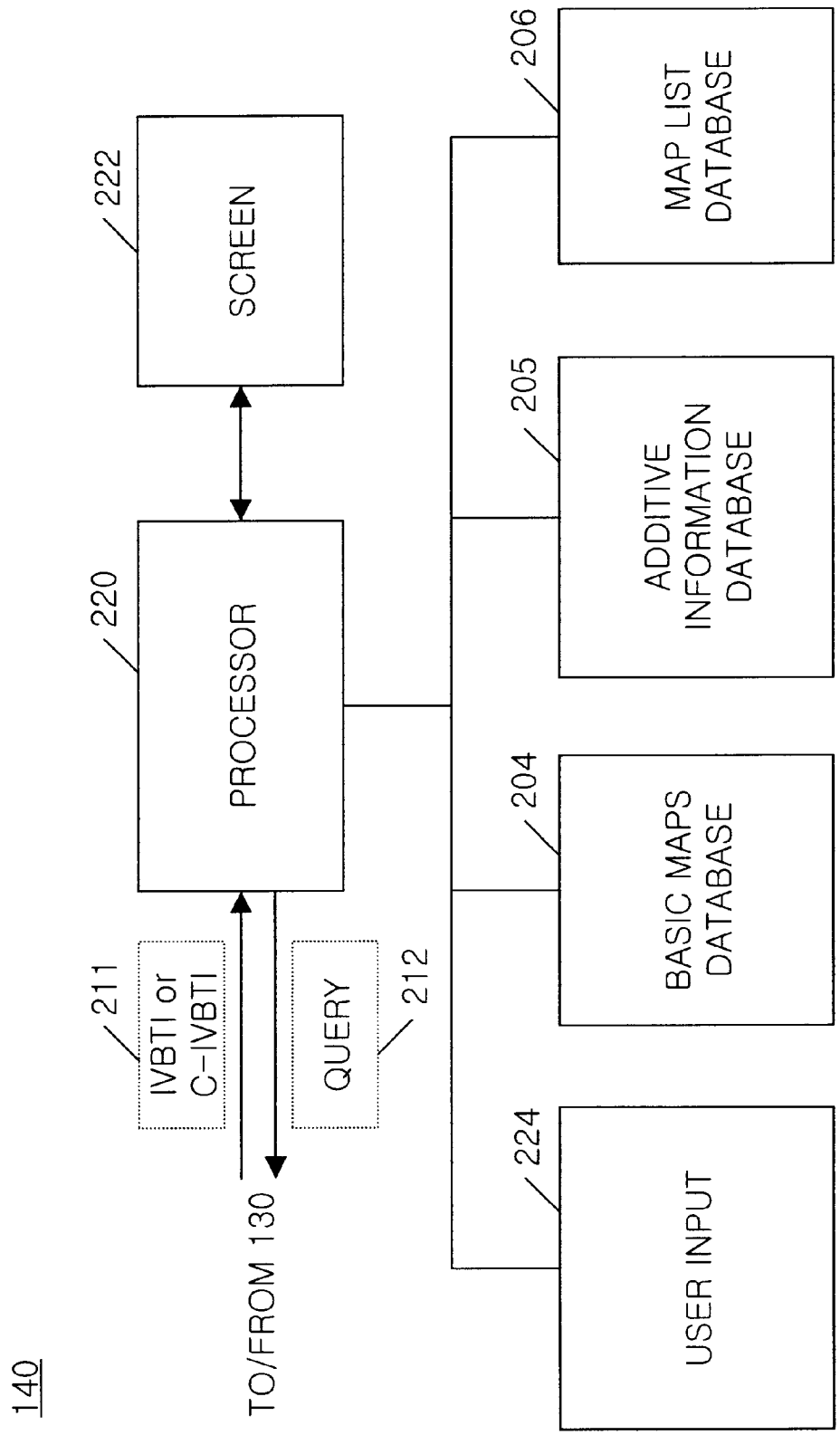

FIGS. 3A and 3B are detailed block diagrams of the traffic information converter 120 and the user device 140, in accordance with another preferred embodiments of the present invention.

Referring to FIG. 3A, the traffic information converter 120 includes the text-based traffic information database 202, the time-variant components list database 203 and the converting processor 207. Meanwhile the user device 140 in FIG. 3B further includes the basic maps database 204, the additive information database 205 and the map list database 206, compared with that shown in FIG. 2C. In this embodiment, the traffic information transmitter 130 may be implemented with that shown in FIG. 2B.

Since the basic maps database 204, the additive information database 205 and the map list database 206 are substantially time-invariant, they may be stored in the user device when manufacturing. Also, the basic maps database 204 is updated, for example, by replacing the corresponding storage(for storing the basic maps database 204) or preferably by downloading periodically a new basic map via communication network from the traffic information converter. The updating of the additive information database 205 and the map list database 206 may be performed similarly to that of the basic maps database 204.

According to still another preferred embodiment of the present invention, the basic maps database 204, the additive information database 205 and the map list database 206 are located in both the traffic information converter 120 and the user device 140.

FIG. 4A is a detailed block diagram of the traffic information converting/transmitting server 180 shown in FIG. 1B, in accordance with one preferred embodiment of the present invention.

The traffic information converting/transmitting server 180 in FIG. 4A includes a converting/transmitting processor 232, the text-based traffic information database 202, the time-variant components list database 203, the basic maps database 204, the additive information database 205, the map list database 206 and the traffic information maps database 213. The converting/transmitting processor 232 is coupled to the text-based traffic information database 202, the time-variant components list database 203, the basic maps database 204, the additive information database 205, the map list database 206 and the traffic information maps database 213 and thus performs updating the text-based traffic information database 202, the generation of TSM, TIM and AIIVEs, and the analysis of the query 212 originated from the user device.

In FIG. 4B, the traffic information converting/transmitting server 180 includes the converting/transmitting processor 232, the traffic information maps database 213, the text-based traffic information database 202 and the time-variant components list database 203. In this case, it is preferable that the user device 140 should have the configuration shown in FIG. 3B. In other words, the user device 140 preferably has the basic maps database 204, the additive information database 205 and the map list database 206.

FIGS. 14A and 14B show a data format for IVBTI(Image Vector-Based Traffic Information) to be transmitted through the communication network from the traffic information transmitter 130 (or the traffic information converting/transmitting server) to the user device 140.

As shown in FIG. 14A, the TIM is divided into plurals and one or more MDS's(Map Description Statements) are interposed between the divided TIMs. The MDS may have the format shown in FIG. 14B, in which the MDS includes the fields of 'data name', 'data description' and 'data size'. Such MDS can be used in the user device 140 for identifying the received data, especially when some of IVBTI(Image Vector-Based Traffic Information) has been lost during transmission, for example, due to the propagation hindrance of a mountain.

Figure 15:
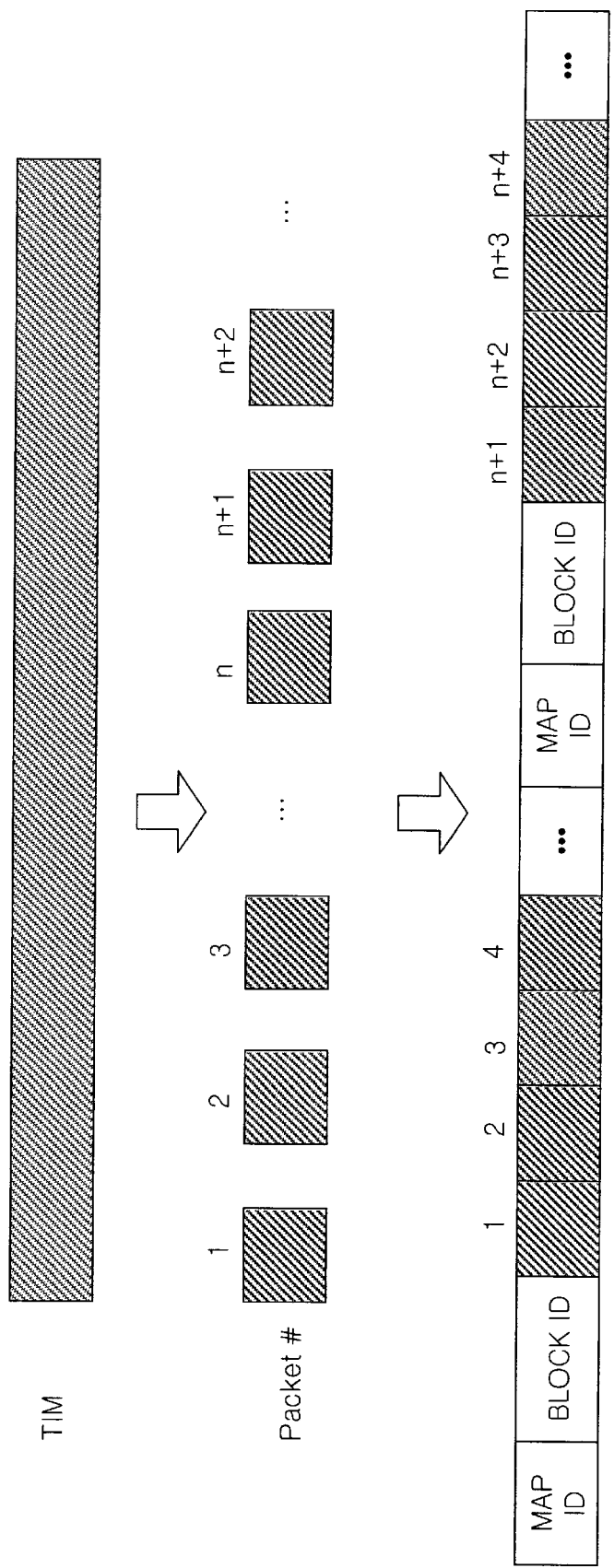
FIG. 15 is a diagram for illustrating the packet transmission of TIM, in accordance with one preferred embodiment of the present invention.

FIG. 15 is for illustrating the packet transmission of TIM, in accordance with one preferred embodiment of the present invention.

As shown in FIG. 15, TIM is divided into a plurality of packets having the same size. Each packet has own packet number and a predetermined number(e. g. 'n') of packets constitute a block. Each block also has own block ID(identification). For transmission, the MAP ID is further added to respective block and thus it is used by the user device 140 for identifying the covered region of the IVBTI.

Preferably, BM, TSM, TIM and/or AI(Additive Information) may have a layer level that represents the necessity for display, and thus the user device 140 displays only BM, TSM, TIM and/or AI having the desired layer level.

FIG. 16A illustrates the format of the basic maps database 204 including the field of 'layer level'. As shown in FIG. 16A, the time-invariant image vector entities included in the covered range of the MAP-1(of which map ID is '1') are classified into multiple groups (e. g. two groups), each of which has different layer level. For example, in the MAP-1, TIIVE1 (composed of ATTRIBUTE(A1), SHAPE(S2) and POSITION(P5, P6)), TIIVE2 (composed of, ATTRIBUTE (A2), SHAPE(S3) and POSITION(P7, P8)) and so on pertain to the layer level of '1', while TIIVE3(composed of ATTRIBUTE(A2), SHAPE(S3) and POSITION(P21, P22)) and so on pertain to the layer level of '2'. Here, the basic map composed of TIIVEs of layer level '1' may be called as 'primary basic map' and the other basic maps may be called as 'additive basic map'.

Referring to FIG. 16B, the time-variant components list database 203 further includes the field of 'layer level'. Similarly, the time-variant real entities included in the covered range of the MAP-1 are classified into multiple groups(e. g. two groups) having different layer levels.

For example, in the MAP-1, ROAD "XX", ROAD "XY" and ROAD "XY" . . . are included in the layer level of '1', while ROAD "Y1", ROAD "Y2" and ROAD "Y3" . . . are included in the layer level of '2'. Here, the time-variant real entities having layer level '1' are converted into TVIVEs of a basic traffic state map.

Figure 16C:
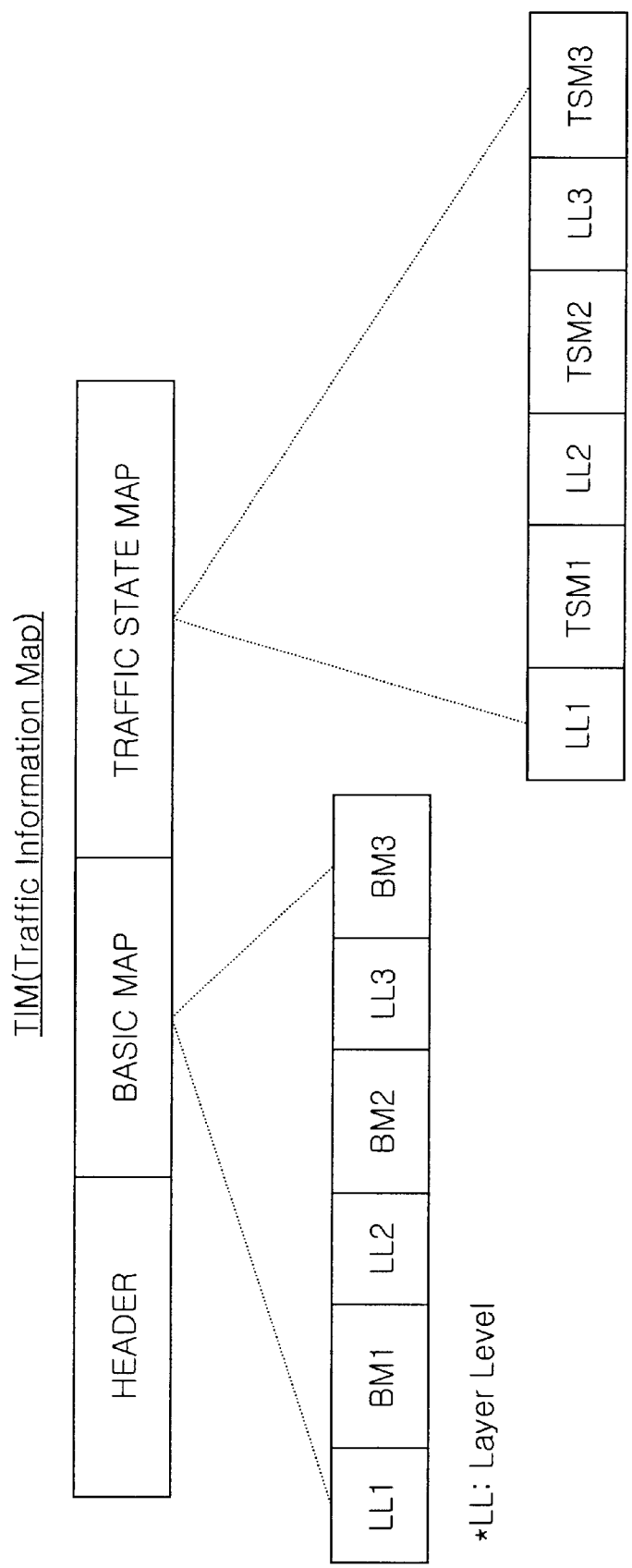
FIGS. 16C–16E show TIM formats in accordance with another preferred embodiment of the present invention.
Figure 16D:
Figure 16E:
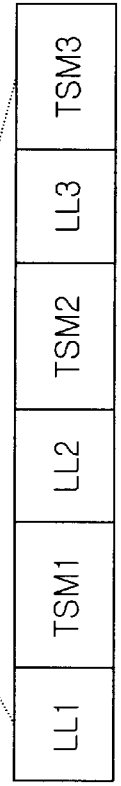

FIGS. 16C–16E show TIM formats in accordance with another preferred embodiments of the present invention.

In FIG. 16C, TIM includes a header part, a basic map part and a traffic state map part. The basic map is composed of multiple pairs of layer level and corresponding basic map (LL1,BM1), (LL2, BM2) and (LL3, BM3).

Alternatively, in FIG. 16D, TIM includes a header and multiple trios (LL1, BM1, TSM1), (LL2, BM2, TSM2), (LL3(1), BM3(1), TSM3(1)), . . . each of which is composed of a LL(layer level), a BM(basic map) and a TSM(traffic state map).

Referring to FIG. 16E, TIM includes a header and a TSM(traffic state map) part which is composed of multiple pairs (LL1, TSM1), (LL2, TSM2), (LL3, TSM3) and so on. In FIG. 16E, each pair is composed of a layer level and a TSM.

Figure 18:
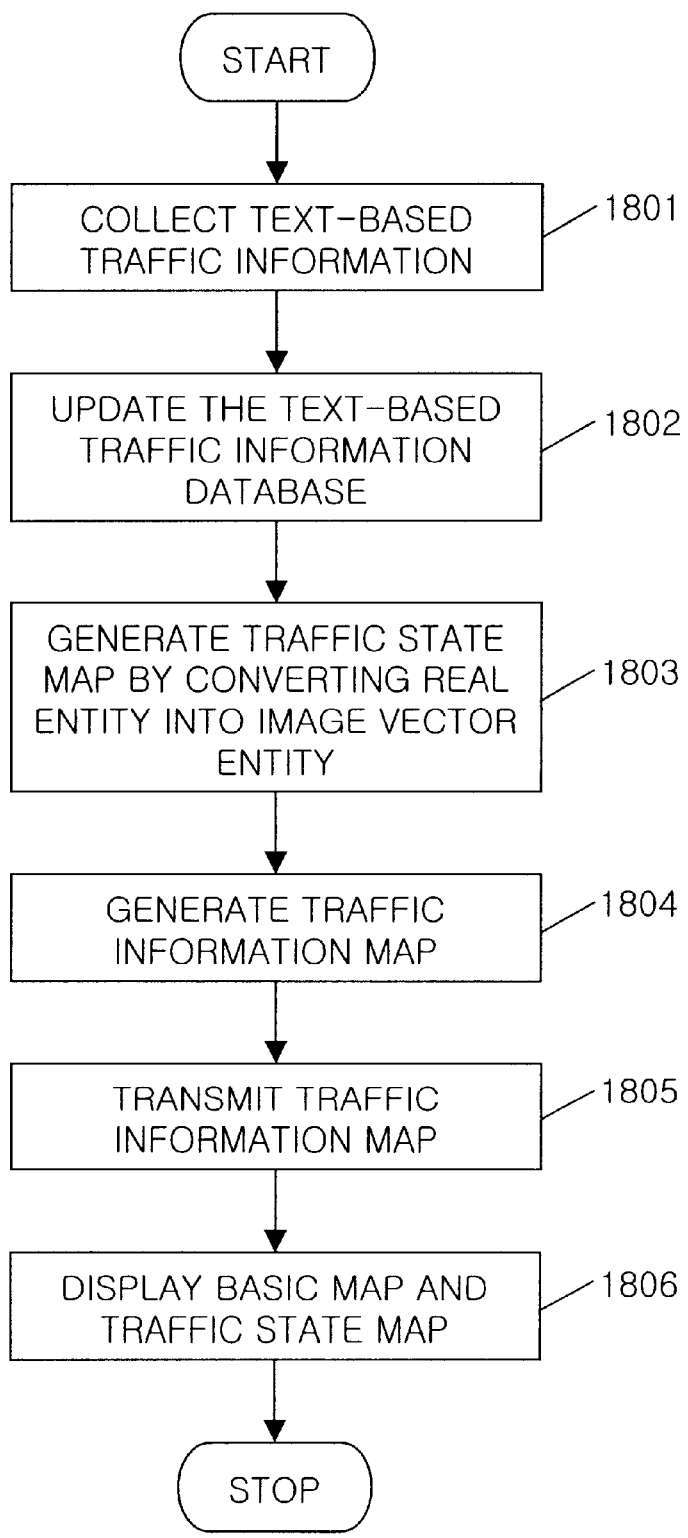
FIG. 18 is a flowchart for illustrating an image-vector based traffic information providing method in accordance with one preferred embodiment of the present invention.

FIG. 18 is a flowchart for illustrating an image-vector based traffic information providing method in accordance with one preferred embodiment of the present invention.

At step 1801, the text-based traffic information is collected by the traffic information collector 110, and then at step 1802 it is used to update the text-based traffic information database. It should be noted that these two steps 1801 and 1802 may be replaced with other traffic information collecting processes.

At step 1803, a traffic state map is generated by converting a real entity(especially time-variant real entity included in a specific range) into an image vector entity. Here, the attribute of the image vector entity is preferably determined in accordance with the traffic information related to the real entity. Then, a traffic information map is formed using the traffic state map and a corresponding basic map. Alternatively, the traffic information map may be formed only using the traffic state map along with 'map-ID'.

The traffic information map is then transmitted to a user device through a communication network at step 1805. At 1806, the user device displays an image for representing traffic information based on the traffic information map. In more detail, the user device displays an image according to the basic map and then cumulatively displays another image according to the traffic state map. Here, the basic map can be stored in the user device, as mentioned above.

Alternatively, it is also possible that the image of TSM is first displayed on a screen of the user device and then the image of BM is displayed.

Figure 17:
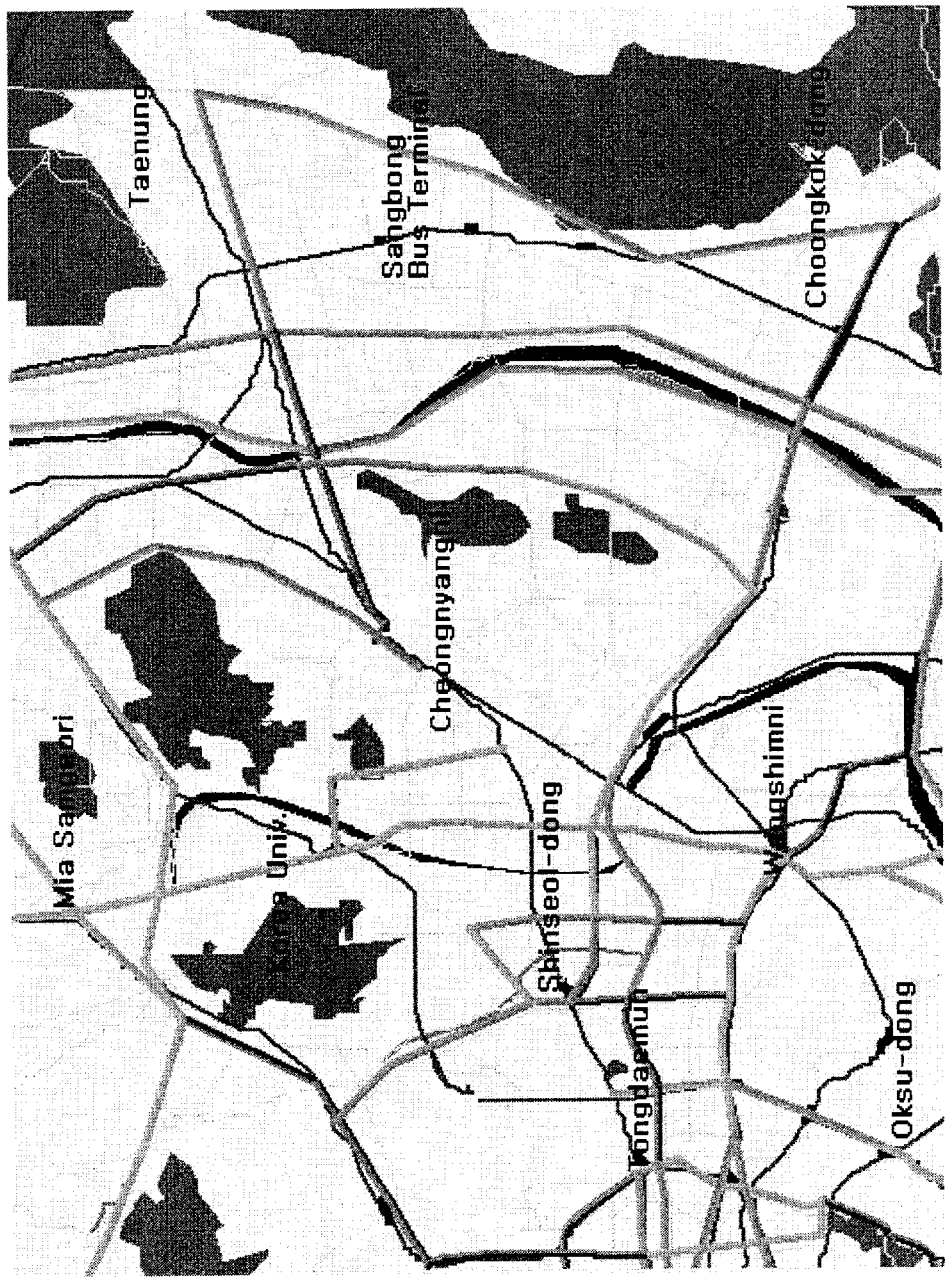
FIG. 17 is an exemplary displayed screen according to this invention.

FIG. 17 is an exemplary displayed screen according to this invention, in which the images of BM and TSM are displayed.

The step 1806 will be in detail explained with reference to FIGS. 19A–19D each of which is a flowchart for illustrating the preferred process performed by the user device in accordance with the present invention.

Figure 19B:
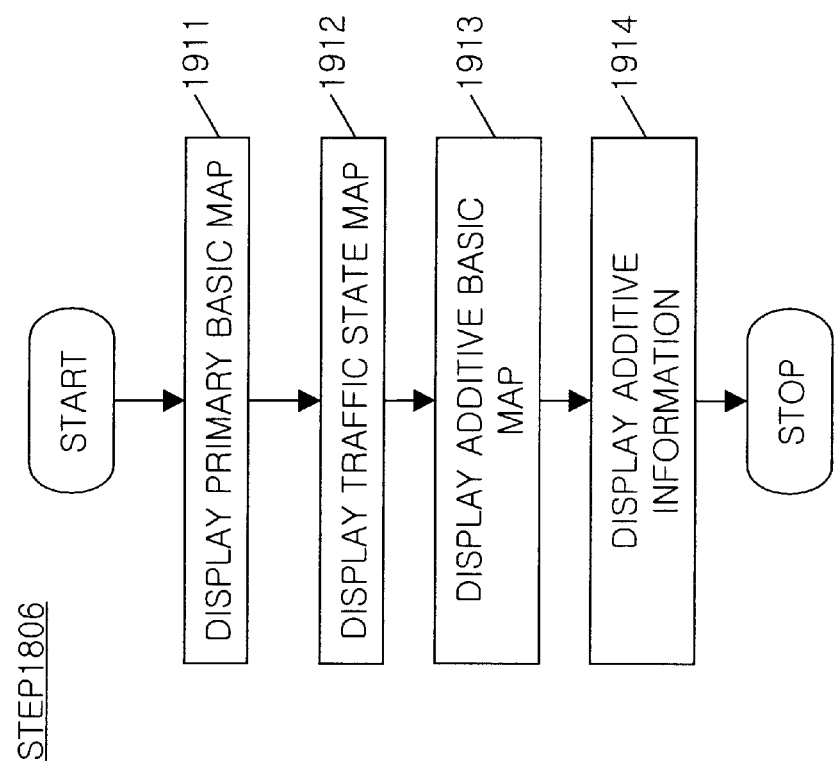
FIGS. 19A–19E are flowcharts for illustrating the preferred process performed by the user device in accordance with the present invention.
Figure 19A:
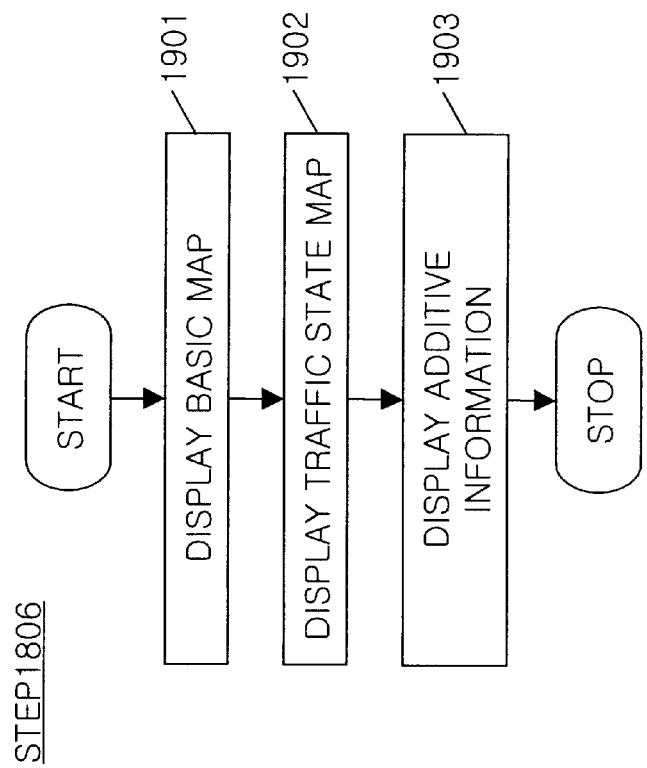

Referring to FIG. 19A, the user device displays an image of BM in step 1901 and then displays an image of TSM in step 1902. The BM may be included in the received TIM or stored in the user device. Also, the covered ranges of the BM and the TSM are the same with each other and the images of BM and TSM are cumulatively depicted on a screen of the user device.

At step 1903, the user device displays an image of AI(Additive Information) which may be included in the received TIM or stored in the user device. The image of AI is also cumulative. That is, the image of AI is overwritten only on the required part of the image of BM and TSM. In addition, in FIG. 19A, the steps of 1901–1903 can be performed in different order.

Referring to FIG. 19B, the user device displays an image of primary basic map at step 1911 and then displays an image of Traffic State Map at step 1912. Subsequently, at step 1913, the user device displays an image of additive basic map. Here, the number of additive basic map may be one or more. Then, at step 1914, the user device displays an image of additive information. The display of the steps 1912–1914 is preferably cumulatively performed such that the images of PBM(Primary Basic Map), TSM, ABM (Additive Basic Map) and AI are simultaneously revealed on the screen.

Figure 19C:
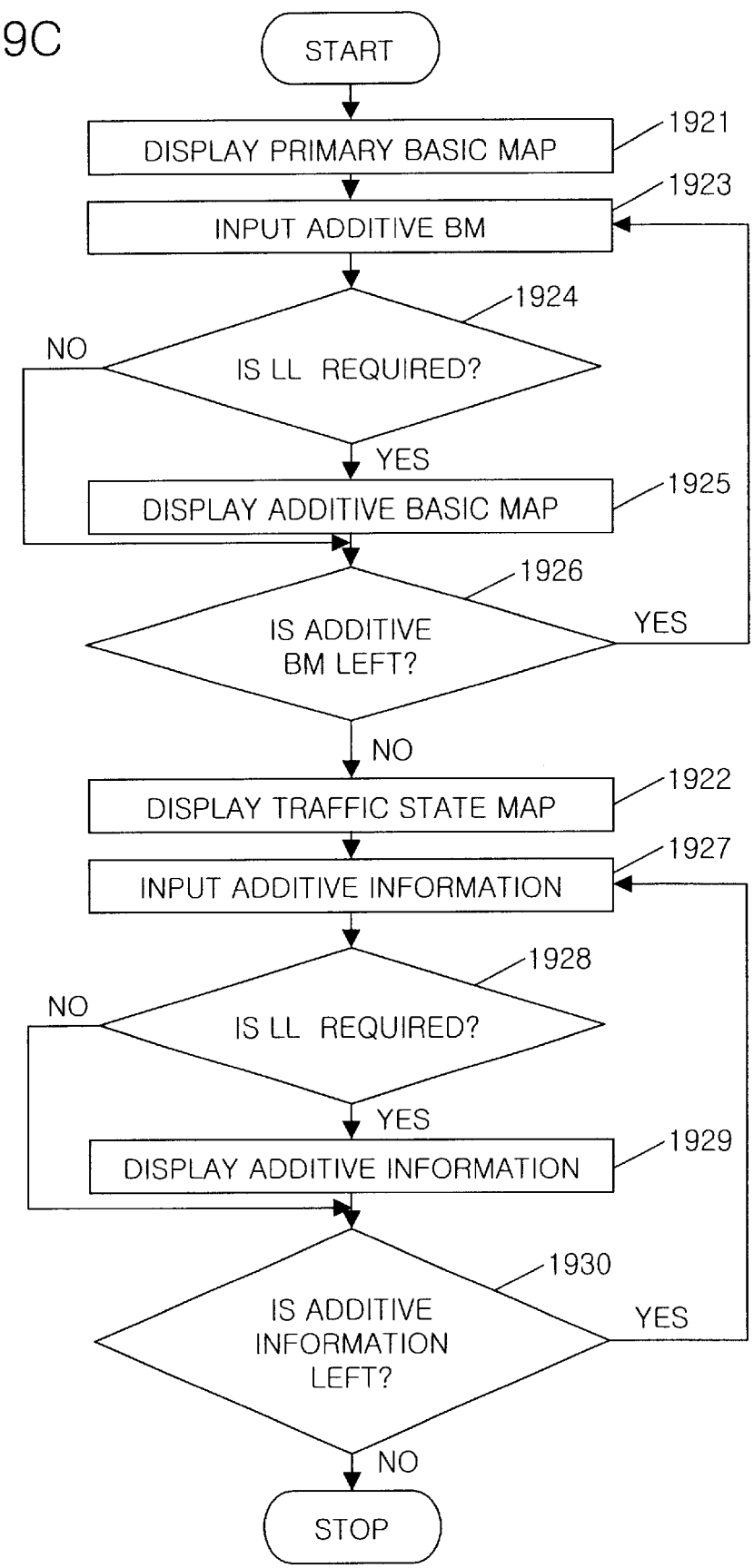

In still another embodiment shown in FIG. 19C, the user device displays an image of PBM at step 1921 and then inputs an additive BM at step 1923. Subsequently, at step 1924 it is checked whether the LL(layer level) of the inputted additive BM is required. If so, then the process proceeds to step 1925 so that it displays an image of the additive basic map. If the check result of step 1924 is negative, the process proceeds to step 1926. In step 1926, it is determined whether any additive basic map is left. If so, the process returns to step 1923. Otherwise, the process proceeds to step 1922, in which the user device displays an image of TSM. Subsequently, the user device inputs an additive information(or additive information image vector) at step 1927 and then checks whether the LL(layer level) of the inputted AI(additive information) is required at step 1928. If the check result of step 1928 is positive, the process proceeds to step 1929 so as to display an image of the additive information and then proceed to step 1930. Meanwhile, if the check result of step 1928 is negative, the process proceeds to step 1930. In step 1930, it is determined whether any AI is left. If so, the process returns to step 1927. Otherwise, the process is ended.

Figure 19D:
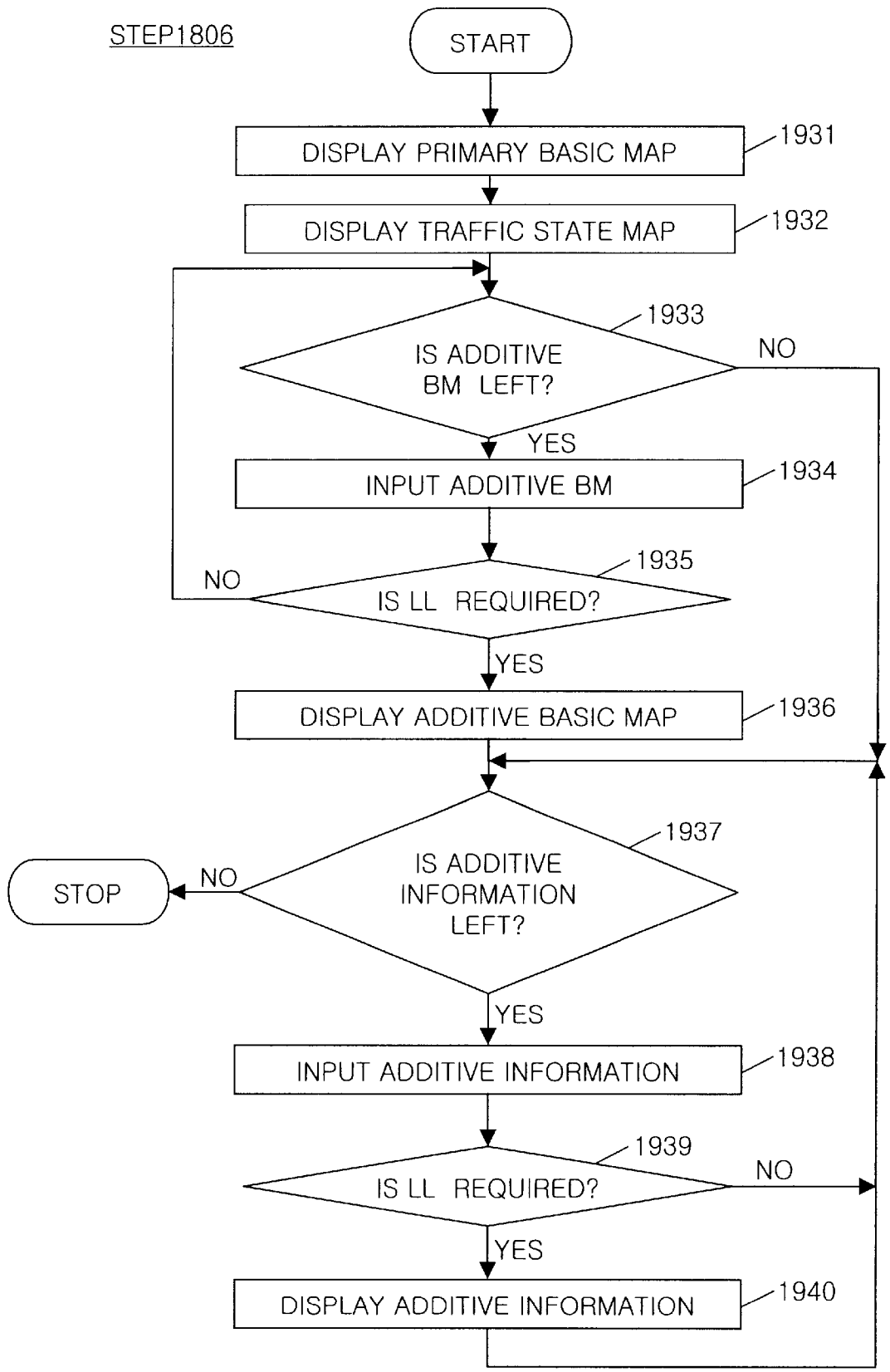

FIG. 19D shows a detailed flowchart of step 1806 shown in FIG. 18, in accordance with still another preferred embodiment of the present invention.

At step 1931, the user device displays an image of primary basic map and then displays an image of traffic state map at step 1932. The step 1933 is for determining whether any additive BM exists. If so, at step 1934 the user device inputs the additive BM and otherwise, the process proceeds to step 1937. It is checked whether the LL(layer level) of the inputted additive BM is required(or selected by the user). In the case of the check result of step 1935 is "yes", the process proceeds to step 1936 so as to display an image of the additive basic map. When the check result of step 1935 is "no", the process returns to step 1933.

At step 1937, it is examined whether any additive information is left. If so, the process goes to step 1938 so as to input an additive information and then advances to step 1939. When the result of the step 1937 is negative, the process is completed.

The step 1939 is for checking whether the LL of the inputted additive information is requested. When answer of step 1939 is "yes", the process advances to step 1940 so that an image for the additive information is displayed and then the process is returned to step 1937. If the answer of step 1939 is "no", the process goes to step 1937.

Figure 19E:
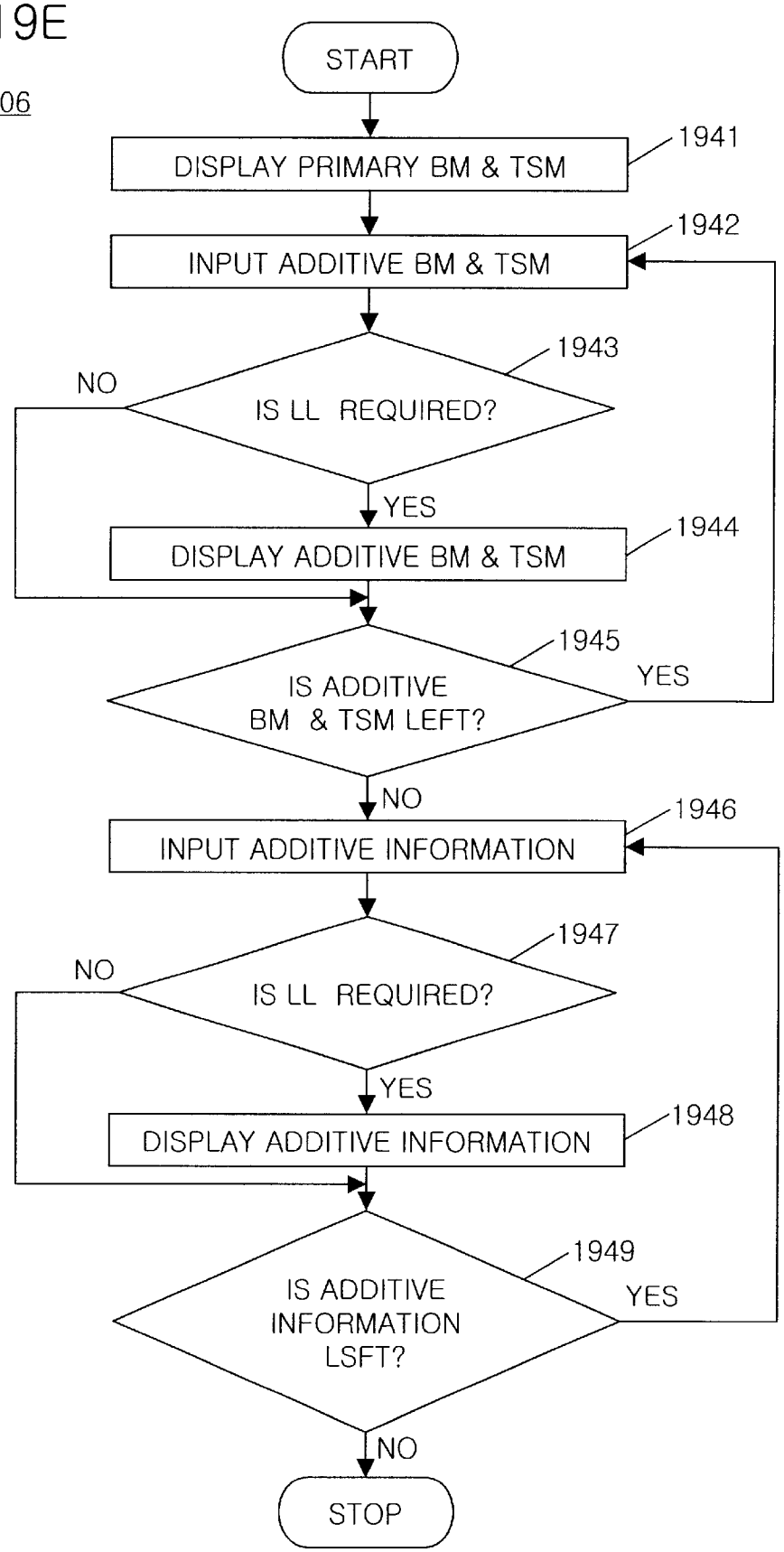

Still another exemplary process flow for step 1806 will be considered with reference to FIG. 19E.

In FIG. 19E, the user device displays images based on the primary BM and primary TSM at step 1941. Here, the primary TSM comes from the traffic information transmitter via a communication network and the PBM(primary basic map) may come from the traffic information transmitter or be stored in a memory within the user device. Then at step 1942 the user device inputs an additive basic map and an additive traffic state map. Similarly, the additive TSM comes from the traffic information transmitter via a communication network and the ABM(additive basic map) may come from the traffic information transmitter or be stored in a memory within the user device. The step 1943 is for a determination whether the LL(layer level) of the inputted ABM(additive basic map) and ATSM(additive traffic state map) is required. If so, the images of the ABM and the ATSM are displayed at step 1944 and then the process goes to step 1945. If the check result of step 1943 is negative, the process skips to step 1945.

In step 1945, the check whether any additive BM or any additive TSM are left is performed. If so, the process is fed back to step 1942 and otherwise, the process goes to step 1946 in which the user device inputs an additive information. Then at step 1947 it is checked whether the LL of the inputted AI is selected. If so, an image for the inputted AI is displayed at step 1948 and then the process advances to the step 1949. If the answer of step 1947 is "no", the process jumps to step 1949. In step 1949, it is determined whether any additive information is left. If so, the process is returned to step 1946. When the check result of step 1949 is negative, the process is halted.

FIG. 20 is a flowchart for illustrating a method for providing a image-based additive information, in accordance with one preferred embodiment of the present invention.

Referring to FIG. 20, a user's request is inputted at step 2001. The input of the user's request is performed by a keyboard, a button key, a touch screen, and other input device. Subsequently, at step 2002, the searching is performed to determine whether the AI(e. g. text string) corresponding to the user's request exists in the AID(Additive Information Database) and to obtain (or read out) the position of the requested AI (see FIG. 10).

The step 2003 is for converting the AI into an image vector based AI (or text-shaped image vector entity). Here, the text-shaped image vector entity is an image vector having a 'text' of shape designating statement. Specifically, the text string of AI may be converted into an image vector whose shape is a predetermined size of 'text' image and whose position is determined by the 'position' field of AI. In a preferred embodiment, the size of the text image can be controlled by user.

The step 2004 is for selecting a suitable BM based on the position field of the AI. This selection is made such that the position of the AI exist within the covered region of the BM. Then, the selected BM and the IVBAI(Image Vector Based Additive Information, that is AIIV(s)) are transmitted from the transmitter to the user device. When the additive information database 205 and the basic maps database 204 are located in the user device, the step 2005 can be omitted(that is, it is optional).

Subsequently, the user device displays an image according to the selected BM at step 2006 and displays an image according to IVBAI (or AIIV(s)) at step 2007. Also, it is well appreciated that the steps 2006 and 2007 can be altered in order.

In accordance with the present invention, the image-based traffic information service can be efficiently performed from the viewpoint of cost and transmission bandwidth. Particularly, when BM(s) are stored in the user device, the bandwidth requested is dramatically reduced, resulting in realizing a real-time interactive image-based traffic information service.

Also, the method for providing image-based traffic information of the present invention can be implemented using either one-way communication network such as a network for beeper (or pager).

The user device of the present invention can be implemented by simple construction since the data to be handled by the user device is relatively small, which results in reducing the cost for manufacturing the user device.

In addition, the introduction of layer level into BM, TSM and/or AI makes it possible to increase the resolution of the displayed image and the fineness of the displayed image can be controlled by user.

The separation AI from BM(even though both of them are substantially composed of time-invariant entities) makes it possible to search a specific kind of information such as hospital, government office or well-known building. Moreover, when BM and/or AI are stored in the user device, they can be updated as necessary by downloading via communication network and this updating may be performed in periodical or on the user's demand.

Also, the traffic information of the present invention is handled in image vector entities so that scaling, rotation or scrolling is easily performed as necessary.

Although preferred embodiments of the present invention has been illustrated and described, various alternatives, modifications and equivalents may be used. Therefore, the foregoing description should not be taken as limiting the scope of the present invention which is defined by the appended claims.

INDUSTRIAL APPLICABILITY

As described above, the method, the system and the user device of this invention are used for providing a traffic information so as to make traffic flows distributed.

What is claimed is:

1. A method of providing an image-based traffic information in a region having at least one time-variant real entity, comprising the steps of:

converting said time-variant real entity into a time-variant image vector entity;

generating an attribute-designating statement of the time-variant image vector entity based on a traffic information so as to form a traffic state map;

transmitting said traffic state map to a user device via a communication network; and displaying an image in accordance with the traffic state map on a screen of the user device.

2. The method according to the claim 1, wherein said attribute-designating statement of the time-variant image vector is a color designating statement.

3. The method according to the claim 2, wherein said time-variant real entity is a road and said color designating statement is determined in accordance with a velocity of the road.

4. The method according to the claim 1, wherein said time-variant image vector entity of the traffic state map includes the attribute-designating statement, an shape-designating statement and a position-designating statement.

5. The method according to the claim 4, wherein said attribute-designating statement is composed of an attribute-designating command and an attribute value.

6. The method according to the claim 5, further comprising the step of compressing said traffic state map such that two time-variant image vector entities for one road are converted into one complex time-variant image vector entity composed of one attribute-designating, two attribute values, a shape-designating statement and a position-designating statement, wherein one of said two time-variant image vector entities is for forward direction and the other is for backward direction of the road.

7. A method of providing an image-based traffic information in a region having at least one time-variant real entity, comprising the steps of:
   converting said time-variant real entity into a time-variant image vector entity;
   generating an attribute-designating statement of the time-variant image vector entity based on a traffic information so as to form a traffic state map;
   converting a plurality of time-invariant real entities into a plurality of time-invariant image vector entities, wherein said plurality of time-invariant real entities are also included in the region;
   forming at least one basic map using said plurality of time-invariant image vector entities;
   forming a traffic information map which includes at least said traffic state map;
   transmitting said traffic information map to a user device via a communication network;
   displaying a first image in accordance with said basic map on a screen of the user device; and
   displaying a second image in accordance with said traffic state map, said second image being cumulatively displayed on the first image.

8. The method according to the claim 7, wherein said attribute-designating statement of the time-variant image vector is a color designating statement.

9. The method according to the claim 7, wherein said time-variant image vector entity of the traffic state map includes the attribute-designating statement, an shape-designating statement and a position-designating statement.

10. The method according to the claim 9, wherein said attribute-designating statement is composed of an attribute-designating command and an attribute value.

11. The method according to the claim 10, further comprising the step of compressing said traffic state map such that two time-variant image vector entities for one road are converted into one complex time-variant image vector entity composed of one attribute-designating, two attribute values, a shape-designating statement and a position-designating statement, wherein one of said two time-variant image vector entities is for forward direction and the other is for backward direction of the road.

12. The method according to the claim 7, wherein said traffic information map further includes said basic map.

13. The method according to the claim 12, wherein said basic map is stored in the user device.

14. The method according to the claim 12, wherein said time-variant image vector entity of the basic map includes the attribute-designating statement, an shape-designating statement and a position-designating statement.

15. The method according to the claim 14, wherein said attribute-designating statement is composed of an attribute-designating command and an attribute value.

16. The method according to the claim 15, wherein said attribute-designating command is functioned as a delimiter or discerning between said time-invariant image vector entities.

17. The method according to the claim 7, further comprising the steps of:
   retrieving at least one text information related to the region;
   converting said text information into a text-shape image vector entity; and
   displaying a third image in accordance with said text-shape image vector entity on the screen of the user device, said third image being also displayed cumulatively on both the first image and the second image.

18. The method according to the claim 17, wherein said traffic information map further includes said text-shape image vector entity.

19. The method according to the claim 17, wherein said steps of retrieving at least one text information related to the region and converting said text information into a text-shape image vector entity, are performed at the user device.

20. The method according to the claim 7, wherein said basic map includes a field of 'layer level' representing the necessity to be displayed, and
   said method further comprising the steps of:
   determining a user's layer level; and
   comparing the field of 'layer level' of said basic map with the user's layer level so as to determine whether the basic map is required to be displayed, and
   wherein said step of displaying a first image is performed in accordance with only the basic map required to be displayed.

21. The method according to the claim 7, further comprising the steps of:
   dividing said traffic information map into a plurality of packets having a predetermined size;
   forming a plurality of blocks each of which is composed of a predetermined number of packets; and
   adding block identifications to said plurality of blocks, respectively,
   wherein said step of transmitting the traffic information map is performed by transmitting said plurality of blocks.

22. A method of providing an image-based information of a region, comprising the steps of:
   converting a plurality of time-invariant real entities into a plurality of time-invariant image vector entities, said plurality of time-invariant real entities being included in the region;
   retrieving at least one text information related to the region;
   converting said text information into a text-shape image vector entity;
   displaying a first image in accordance with said plurality of time-invariant image vector entities on a screen of the user device; and
   displaying a second image in accordance with said text-shape image vector entity on the screen of the user device, said second image being displayed cumulatively on the first image.

23. A system of providing an image-based traffic information in a region, comprising:
   a time-variant components list database including a plurality of time-variant component lists each of which has at least one time-variant real entity in a specified region;
   a conversion table representing correspondences of time-variant real entities and an time-variant image vector entities;
   means for generating a traffic state map by converting the time-variant real entity included in a specified region into the time-variant image vector entity using said conversion table and by generating an attribute-designating statement of the time-variant image vector entity based on a traffic information; and means for transmitting said traffic state map to a user device via a communication network.

24. The system according to the claim 23, wherein said time-variant image vector entity of the traffic state map includes the attribute-designating statement, an shape-designating statement and a position-designating statement.

25. The system according to the claim 24, wherein said attribute-designating statement is composed of an attribute-designating command and an attribute value.

26. The system according to the claim 25, further comprising means for compressing said traffic state map such that two time-variant image vector entities for one road are converted into one complex time-variant image vector entity composed of one attribute-designating, two attribute values, a shape-designating statement and a position-designating statement, wherein one of said two time-variant image vector entities is for forward direction and the other is for backward direction of the road.

27. The user device according to the claim 25, further comprising means for converting said selected additive information into a text-shape image vector entity.

28. The system according to the claim 23, further comprising a basic maps database for storing a plurality of basic maps, each of which is composed of a plurality of time-invariant image vector entities, wherein each of time-invariant real entities included in the region is represented by at least one time-invariant image vector entity.

29. The system according to the claim 28, wherein said time-variant image vector entity of the basic map includes the attribute-designating statement, an shape-designating statement and a position-designating statement.

30. The system according to the claim 29, wherein said attribute-designating statement is composed of an attribute-designating command and an attribute value.

31. The system according to the claim 30, wherein said attribute-designating command is functioned as a delimiter for discerning between said time-invariant image vector entities.

32. The system according to the claim 30, further comprising means for converting said text information and corresponding position data into a text-shape image vector entity.

33. The system according to the claim 23, further comprising an additive information database for storing a plurality of text information and corresponding position data.

34. The system according to the claim 23, further comprising a map list database for storing a plurality of map identification and corresponding covered range data.

35. The system according to the claim 23, further comprising:
    means for producing a traffic information map using at least said traffic state map;
    a traffic information maps database for storing said traffic information map; and
    means for transmitting said traffic information map on a user's request.

36. A user device for displaying an image-based traffic information, comprising:
    a screen;
    means for receiving a traffic information map from a traffic information providing server via a network, wherein said traffic information map includes at least a traffic state map composed of at least one time-variant image vector entity and an attribute-designating statement of said time-variant image vector entity is determined in accordance with a traffic information related to corresponding real entity; and
    means for displaying a first image in accordance with a basic map which is composed of a plurality of time-invariant image vector entities included in a specified region and for displaying a second image in accordance with said traffic state map on said screen, said second image being cumulatively displayed on the first image.

37. The user device according to the claim 36, further comprising an input means for inputting a user's command including a region selection command.

38. The user device according to the claim 37, further comprising a basic maps database for storing a plurality of basic maps.

39. The user device according to the claim 37, further comprising an additive information database for storing a plurality of text information and corresponding position data.

40. The user device according to the claim 39, further comprising means for converting said text information and corresponding position data into a text-shape image vector entity.

41. The user device according to the claim 37, further comprising a map list database for storing a plurality of map identification and corresponding covered range data.

42. A user device for displaying an image-based information, comprising:
    a screen;
    an input means for inputting a user's command including a position name to be wanted to know;
    an additive information database for storing a plurality of additive information, each of which is composed of a text string and a position data;
    means for retrieving one additive information based on the user's command;
    a basic maps database for storing a plurality of basic maps each of which is composed of a plurality of time-invariant image vector entities, wherein each of time-invariant real entities included in a region is represented by at least one time-invariant image vector entity;
    means for selecting at least one basic map in accordance with the retrieved additive information;
    means for displaying a first image based on the selected basic map; and
    means for displaying a second image based on the selected additive information.

43. A program storage device readable by a digital processing apparatus and tangibly embodying a program of instructions executable by the digital processing apparatus to perform method steps for providing an image-based traffic information in a region having at least one time-variant real entity, said method comprising the steps of:
    converting said time-variant real entity into a time-variant image vector entity;
    generating an attribute-designating statement of the time-variant image vector entity based on a traffic information so as to form a traffic state map; and
    transmitting said traffic state map to a user device via a communication network.

44. A program storage device readable by a digital processing apparatus and tangibly embodying a program of instructions executable by the digital processing apparatus to perform method steps for providing an image-based traffic information in a region having at least one time-variant real entity, said method comprising the steps of:
    converting said time-variant real entity into a time-variant image vector entity;

generating an attribute-designating statement of the time-variant image vector entity based on a traffic information so as to form a traffic state map;

converting a plurality of time-invariant real entities into a plurality of time-invariant image vector entities, wherein said plurality of time-invariant real entities are also included in the region;

forming at least one basic map using said plurality of time-invariant image vector entities;

forming a traffic information map which includes at least said traffic state map; and transmitting said traffic information map to a user device via a communication network.

45. A method for displaying an image-based traffic information comprising the steps of:

receiving a traffic information map which includes at least a traffic state map, said traffic state map includes a plurality of time-variant image vector entities in a specified region and each of the time-variant image vector entity includes an attribute-designating statement, an shape-designating statement and a position-designating statement;

displaying a first image in accordance with a basic map on a screen, said basic map including a plurality of time-invariant image vector entities in the specified region; and displaying a second image in accordance with said traffic state map such that said second image is cumulatively displayed on the first image.

46. A program storage device readable by a digital processing apparatus and tangibly embodying a program of instructions executable by the digital processing apparatus to perform method steps for displaying an image-based traffic information, said method comprising the steps of:

receiving a traffic information map which includes at least a traffic state map, said traffic state map including a plurality of time-variant image vector entities in a specified region and each of the time-variant image vector entity includes an attribute-designating statement, an shape-designating statement and a position-designating statement;

displaying a first image in accordance with a basic map on a screen, said basic map includes a plurality of time-invariant image vector entities in the specified region; and displaying a second image in accordance with said traffic state map such that said second image is cumulatively displayed on the first image.

* * * * *